United States Patent
Ohno et al.

(10) Patent No.: US 6,404,335 B1
(45) Date of Patent: Jun. 11, 2002

(54) APPARATUS FOR ISSUING WIRELESS INFORMATION STORAGE MEDIA

(75) Inventors: Tadayoshi Ohno; Tsuneshi Yokota, both of Kawasaki (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/154,630

(22) Filed: Sep. 17, 1998

(30) Foreign Application Priority Data

Sep. 19, 1997 (JP) ............................................ 9-255805
Sep. 19, 1997 (JP) ............................................ 9-255808
Sep. 19, 1997 (JP) ............................................ 9-255809

(51) Int. Cl.$^7$ ............................................... G08B 23/00
(52) U.S. Cl. ...................... 340/505; 340/875.3; 455/6.3
(58) Field of Search .............................. 340/505, 825.3, 340/825.34; 455/6.3

(56) References Cited

U.S. PATENT DOCUMENTS 5,682,142 A * 10/1997 Loosmore et al. ....... 340/572.1
5,943,603 A    8/1999 Parulski et al. ............... 455/3.1

FOREIGN PATENT DOCUMENTS

| EP | 0 595 549 | 5/1994 |
| JP | 04350016 | 12/1992 |
| JP | 4-368894 | 12/1992 |
| JP | 06124369 | 5/1994 |
| JP | 9-104189 | 4/1997 |

* cited by examiner

*Primary Examiner*—Daryl Pope
(74) *Attorney, Agent, or Firm*—Pillsbury Madison & Sutro LLP

(57) ABSTRACT

A method of issuing a wireless tag includes a step of printing visual information corresponding to at least part of predetermined information to be stored in a nonvolatile memory of the tag on an image recording area of the tag, a step of writing the predetermined information into the memory by transmitting the information to the wireless tag by radio, and a step of reading the information written into the memory therefrom by radio and checking the read information with the predetermined information before writing. The number of checks made on a wireless tag is counted. A wireless tag for which the number of checks made reaches a predetermined number is recalled as defective.

14 Claims, 18 Drawing Sheets

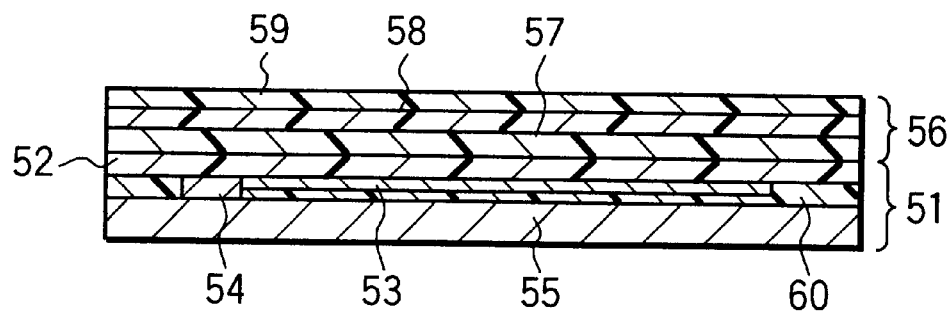
FIG. 8
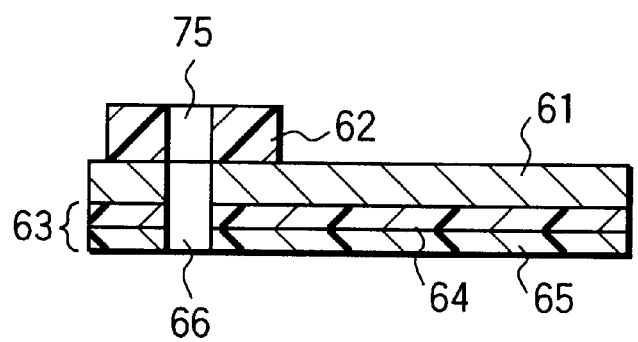
FIG. 9
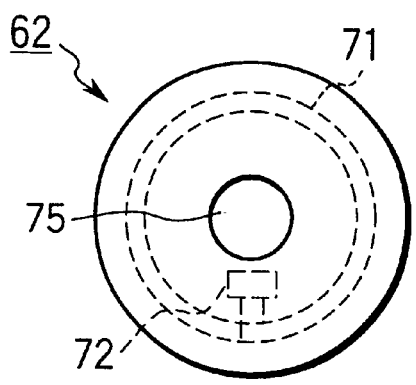 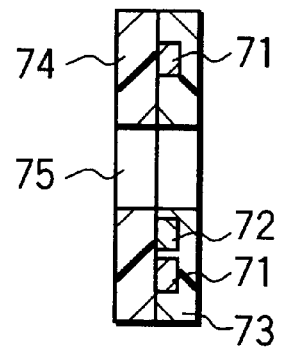
FIG. 10A    FIG. 10B

APPARATUS FOR ISSUING WIRELESS INFORMATION STORAGE MEDIA

BACKGROUND OF THE INVENTION

1. Field of the Invention

The present invention relates to a method of issuing information storage media to be attached to commodities or articles for processing them, and more particularly to a wireless information storage medium which can be read from and written into by radio and an apparatus and method for issuing the storage medium.

2. Description of Related Art

Recently attention has been paid to a wireless information storage medium that can communicate by radio transmissions and read information from an internal storage device, such as an IC memory, or write information into the storage device.

This type of a wireless information storage medium has been attached as a wireless tag to objects for the purpose of preventing shoplifting or used as a ski lift ticket in. In addition, an attempt has been made to incorporate the storage medium into a commuter's pass for a wireless automatic ticket inspecting system.

A system employing such wireless information storage media (cards, tags, or the like) allows predetermined processing to be performed without inserting or otherwise connecting the media into a processing machine. The lack of a required contact between the storage media and the processing machine produces a convenience that conventional systems lack.

A wireless information storage medium, such as a wireless tag, usually lacks an image display that can be seen by people. Certain applications (i.e. shoplifting preventive system) for a storage medium, however, do not require a system in which information concerning commodities or goods is shown visually to persons or customers.

In addition to the system described below, a variety of systems that use wireless tags have been proposed. For example, information contained in tags attached to goods a customer purchases can be read by radio and used for accounting purposes. This will provide a more efficient accounting process than that which is employed currently. In this case, however, it is necessary for the customers to be able to confirm the prices of the goods themselves.

In the field of distribution of goods, a system can use wireless tags attached to goods to acquire information particular to each good at each distribution point and, thereby control the flow of goods. Moreover, wireless tags can be used for managing manufacturing processes by attaching wireless tags for manufacture management by attaching wireless tags to articles during the manufacturing process itself. In such a system, it will be essential for a site worker or manager to be able to confirm visually the information corresponding to an article for the purpose of dealing with unexpected accidents such as tag damage, communications failures, etc.

To solve this problem, Jpn. Pat. Appln. KOKAI Publication No. 4-368894 discloses a built-in noncontact recording medium which has a noncontact recording means and a surface with a rewritable visible information recording area consisting of a heat-reversible material. In other words, the recording area that permits visible information to be recorded by heat in a rewritable manner is formed on the surface of the noncontact recording medium which has a built-in noncontact recording means.

The above-described wireless information storage media are portable but are relatively poor in flexibility. Thus, various restraints may arise in attaching them to articles as price tags, article tags, and manufacture process management tags.

Jpn. Pat. Appln. KOKAI Publication No. 9-104189 discloses an information storage medium in which an electronic component such as a noncontact recording means, is fixed to the surface of a paper-like base member. A printing medium is also attached to allow repeated printing of visible information. Thus, although the information storage medium has good flexibility, the electronic component maybe subject to breaking due to the mechanical stress.

Jpn. Pat. Appln. KOKAI Publication No. 9-104189 also discloses a storage medium issuing apparatus for issuing the information storage medium, that is equipped with a writing/printing unit for writing and printing ID information into and onto an ID tag as an information storage medium. The writing/printing unit has a transmitter/receiver unit, an ID tag stacker, a printer, a feed mechanism for feeding ID tags to the printer, an eject mechanism for ejecting the ID tags after printing, a printer controller, and a main controller for controlling these components.

The printer has printing means for printing information on the ID tag rewritable paper and erasing means for erasing printed information. The transmitter/receiver unit has an antenna for make communications with the ID tag and a transmitter/receiver circuit for modulating and demodulating information.

The main controller enters data to be written from a host computer through a host interface and controls the printer controller, the printer, and the transmitter/receiver unit for controlling the writing and printing of the ID information. To this end, the main controller has an MPU for such control and a memory for storing data that is entered through the host interface.

The issuing apparatus has means for deciding whether or not ID information has been recorded on an ID tag. If the ID information has already been recorded, it is erased and new ID information is written. The number of times ID information is written is handled as part of the ID information. The number of write operations is printed or the ID information printed position is changed according to the number of write operations.

In issuing a wireless information storage medium, the issuing apparatus, as described above writes given information into the information storage unit and prints the visible information onto the visible information recording area. However, because a semiconductor circuit forming the information storage unit is generally an IC or LSI component, the circuit may be damaged due to the mechanical stress exerted at the time of printing visible information. In particular, when a recording head is in contact with an information recording medium, as in a printing system, in which a thermal head is used as the recording head, the thermal or mechanical stress may be imposed on the IC or LSI built into the information storage medium. Such a stress causes the wireless information storage medium, that has malfunctioning semiconductor circuit, to issued, resulting in low yields.

Sometimes it is necessary to issue wireless information storage media in large quantities. In this case, it is necessary to store the same information into and print the same visible information on a large number of wireless information storage media. Thermal printing, however, takes a very long time compared to storing wireless information. The time required to issue one wireless information storage medium depends greatly on the time required to print visual information. It is therefore, difficult to reduce the processing time.

BRIEF SUMMARY OF THE INVENTION

It is an object of the present invention to provide an issuing method and apparatus which permits wireless information storage media to be issued without damaging a built-in electronic component.

It is another object of the present invention to provide an issuing method and apparatus which permits wireless information storage media to be issued in large quantities with a good yield.

According to an aspect of the present invention, a method of issuing a wireless information storage medium provided with a wireless information storage unit that has a memory section for storing information, a wireless transmitter/receiver section for transmitting and receiving information by radio, and an image recording unit for displaying visual information comprising the steps writing the information into the memory section by transmitting predetermined information to be stored into the memory section to the wireless transmitter/receiver section by radio and printing visual information corresponding at least part of the information to be stored into the memory section on the image recording unit of the wireless information storage medium.

The method further comprises reading the information written into the memory section of the wireless information storage unit through the wireless transmitter/receiver section to check the stored information read from the memory section with the information before transmission to the wireless information storage unit.

The method further comprises separating wireless information storage media after the writing the information into the memory section according to the results of checks and printing the information found on the wireless information storage media for which the results of checks indicate a match.

The method further comprises re-writing the information into the memory section of the information storage unit for which the results of checks indicate a mismatch.

Separating the wireless information storage media includes recalling the wireless information storage media if the check results indicate a mismatch even after repeatedly writing to the memory section.

The method further includes binding the image recording unit that visually displays information with the wireless information storage unit that is written with the stored information.

The method further includes reading the stored information from the memory section through the wireless transmitter/receiver section to check the information that was read with the information before transmission.

When writing information unto the memory section, the information is written successively into each of a plurality of wireless information storage units. The method further includes separating the wireless information storage units after writing information according to the results of checks and binding a wireless information storage unit for which the check result indicates a match with an image recording unit printed with the visual information.

The method further comprises re-writing information on the memory section of the information storage units when the results of checks indicate a mismatch.

Separating includes recalling the information storage units for which the check results indicate a mismatched even after writing information onto memory section has been performed a predetermined number of times.

According to another aspect of the present invention, an apparatus for issuing a wireless information storage medium provided with a semiconductor integrated circuit that has a memory section for storing information, a wireless transmitter/receiver section for transmitting and receiving information by radio and an image recording area which is placed away from the semiconductor integrated circuit and displays visual information comprises of: an insertion/ejection port for inserting or ejecting the wireless information storage medium; printing means for printing visual information corresponding to at least part of information to be written into the memory section on the image recording area; first carry means for carrying a wireless information storage medium inserted into the insertion/ejection port with its information recording area at the head to a position where it is opposed to the printing means; reader/writer means installed between the insertion/ejection port and the printing means for writing information into the semiconductor integrated circuit in a non-contact manner; and second carry means for carrying the wireless information storage medium to the insertion/ejection port for ejection.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments give below, serve to explain the principles of the invention.

FIG. 8 is a schematic longitudinal sectional view of a wireless information storage medium according to still another embodiment;

FIG. 9 is a schematic longitudinal sectional view of a wireless information storage medium according to a further embodiment;

FIGS. 10A and 10B are plan and sectional views, respectively, of the wireless information storage element of FIG. 9;

DETAILED DESCRIPTION OF THE INVENTION

Figure 1:
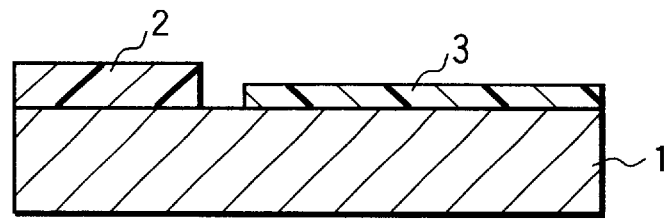
FIG. 1 is a schematic longitudinal sectional view of a wireless information storage medium according to an embodiment of the present invention.
Figure 2:
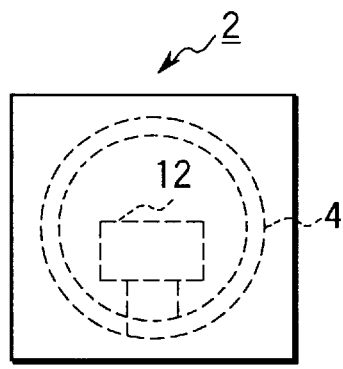
FIG. 2 is a schematic plan view of the wireless information storage medium of FIG. 1.

FIG. 1, illustrates in sectional view an embodiment of a wireless information storage medium of the present invention. On one side of a sheet-like base member 1 there are provided a wireless information storage unit 2 and an image (visible information) recording unit (area) 3. For example, the base member may consist of plastic, such as polyethylene terephthalate or vinyl chloride resin, paper, such as wood free paper, or synthetic paper. In this example, a sheet of synthetic paper of about 60 $\mu$m in thickness is used. The wireless information storage unit 2 has a wireless information storage element and an antenna which are molded with a resin.

The wireless information storage unit will be described below more specifically. The storage unit comprises a transmitting/receiving antenna 4 that includes a loop coil and a wireless information storage element (LSI chip) 12 molded from a plastic into the form of a stand-alone component.

Thus, having the wireless information storage element 12 and the antenna 3 integrally molded, the wireless information storage unit 2 has excellent mechanical durability and high reliability. In this embodiment, the wireless information storage unit 2 measures 25 mm×25 mm.

Figure 3:
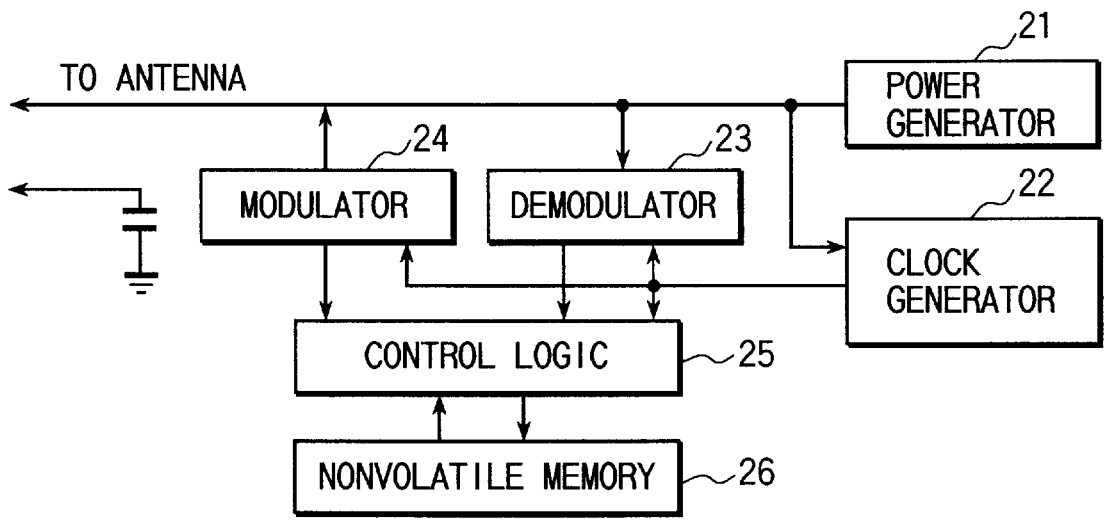
FIG. 3 shows a circuit arrangement in block diagram form of an electronic component built into the wireless information storage medium of FIG. 2.

FIG. 3 shows a circuit arrangement of the wireless information storage element 12, which that includes a power generator 21, a clock generator 22, a demodulator 23, a modulator 24, a control logic 25, and a nonvolatile memory 26 used to store information.

A modulated data signal that is sent from an external device and received by the antenna 4 is applied to both the power generator 21 and the clock generator 22. The power generator rectifies the modulated data signal and smoothes the rectified output and supplies the pulses power to each circuit component. The clock generator generates clock pulses from the modulated data signal and supplies the pulses each circuit component. The received modulated data signal is demodulated by the demodulator 23 and the resulting original data signal is then stored in the nonvolatile memory 26 under the control of the control logic 25.

When a read instruction is received externally, information is read out of the nonvolatile memory 26 under the control of the control logic 25. The information is modulated by the modulator 24 into a form suitable for radio transmission and then transmitted through the antenna 4.

Next, the image recording unit 3 will be described. As the image recording unit 3, use may be made of a rewritable recording layer, a thermosensible recording layer, or an ink-jet recording layer. In this embodiment, the ink-jet recording layer is used.

Hereinafter, a method of manufacturing the wireless information storage medium will be described with reference to FIG. 1. First, the image recording unit 3 is formed as follows: An ink accepting layer application liquid that is a mixture of an alumina sol containing a solid content of 18% synthesized from aluminum alkoxide and a solution containing a polyvinyl alcohol content of 6% by weight is applied to a sheet of synthetic paper in the form of a strip. The application is such that the applied width (the width of the image recording unit 3) is 60 mm, the non-applied width (the width of the base member 1 minus the applied width 3) is 30 mm, and the thickness after drying is 10 $\mu$m. The applied layer is dried to form a strip ink accepting layer (image recording unit).

Next, the wireless information storage units 2 are put on the non-applied area of the base member at intervals of 30 mm. The synthetic paper which is provided on top with a plurality of image recording units 3 and a plurality of wireless information storage units 2 is cut into pieces each having a wireless information storage unit and an ink accepting layer of 30 mm×60 mm.

The wireless information storage medium of this embodiment has a feature that a wireless information storage unit and an image recording unit are provided on the same base member. Thus, a wireless information storage medium can be realized which provides better flexibility than conventional ones and fits any article to which it is to be attached like a label.

With conventional wireless tags, their contents cannot be confirmed without the use of a reader/writer. With the wireless information storage medium of this embodiment, however, since at least part of information stored is visually displayed, users can visually confirm information concerning articles as needed.

In addition, since the wireless information storage unit and the image recording unit are provided on one side of a base member, its other side can be utilized for advertisement or as a message board. The other side can also be utilized for attachment to an article.

Moreover, by providing an ink-jet recording layer as an image recording unit, an ink-jet recording system that does not subject the wireless information storage unit to mechanical stress can be used to print visual information. An image recording unit can also be formed on the wireless information storage unit.

The size of each of the wireless information storage unit and the image recording unit may be set arbitrarily. Further, in addition to the ink-jet recording unit, image recording units suitable for various recording systems, including thermal recording systems, rewritable recording systems, etc., can be used.

Figure 4:
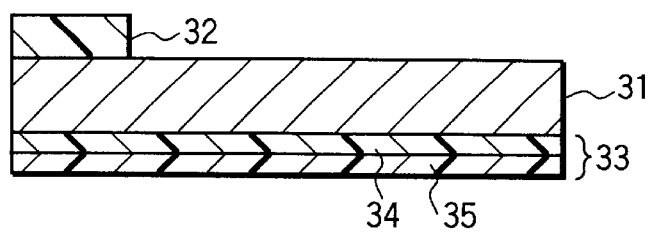
FIG. 4 is a schematic longitudinal sectional view of a wireless information storage medium according to another embodiment.

FIG. 4 is a sectional view of a wireless information storage medium according to another embodiment. In this figure, 31 denotes a sheet-like base member, which is provided at an end of its one side with a wireless information storage unit 32 and on its other side with an image recording unit 33. The wireless information storage unit 32 is identical in arrangement used by the wireless information storage unit 2 in the previous embodiment and hence, its description is omitted. The image recording unit 33 is composed of a rewritable recording layer 34 and a protective layer 35.

The base member 36 may be made of plastic, such as polyethylene terephthalate (PET), vinyl chloride resin, or the like, or synthetic paper. When the image recording unit 33 is used a plurality of times, a base member that is durable is preferred. The thickness of the base member is set to less than 1 mm and preferably to 10 to 500 $\mu$m. In this embodiment, a PET sheet of 188 $\mu$m in thickness is used as the base member.

Next, the formation of the rewritable recording layer 34 of the image recording unit 33 will be described. The recording layer may be made of a coloring rewritable recording material, a high molecular matrix/low molecular composite film material, a magnetic capsule recording material, or the like.

An example of a coloring rewritable recording material is a leuco-dye-based rewritable recording material which is composed of a leuco dye and a reversible developer. As an example of a reversible developer, there is a compound having decolorizer and a long chain alkyl group.

The decolorizer is a compound having an acid region and a basis region within a molecule. Examples of such materials include salts of phenol carboxylic acid and organic amine, complex salts of phenolic compound and organic amine, and organic amphoteric compounds. For example, such materials are disclosed in for example, Jpn. Pat. Appln. KOKAI Publications Nos. 6-191150 and 6-191151.

Examples of compounds having a long chain alkyl group with reversible development include ascorbic acid compounds having a long aliphatic alkyl group, phosphonic acid compounds, and phenolic compounds. When heated and melted, the rewritable recording material exhibits a colored state at room temperature. When heated to a temperature lower than coloring temperatures, the material in the colored state becomes discolored at room temperature. Such recording materials are disclosed in, Jpn. Pat. Appln. Publications Nos. 5-96852 and 5-193257.

The leuco dye combined with the reversible. developer shows the electron donative property and may be a fluoran compound which is conventionally known. The leuco dye is colored black, red, blue, or yellow depending on a dye compound used and can be used as a color recording material as well.

The high molecular matrix/low molecular composite film rewritable recording material is a reversible thermal recording material which reversibly shows either of the opaque state and the transparent state depending on a heating temperature. When used as a recording medium, either state in which the colored layer underlying the rewritable recording layer is visible (the recording layer is transparent) or invisible (the recording layer is opaque) is used as a recorded state. This material is a film in which an organic low molecular weight compound, such as stearic acid or behenic acid, which are higher fatty acids, is dispersed in a resin such as a vinyl chloride resin or vinyl chloride—vinyl acetate copolymer. Such recording materials are disclosed in, Jpn. Pat. Appln. Publications Nos. 2-1363, 3-2089, and 4-201596.

An example of a magnetic capsule recording material is a sheet coated with capsules which seal in flake metal fines of iron, nickel, or iron-nickel-chromium together with a medium vehicle consisting of a polar solvent and a thermoplastic resin. This makes a portion in which the flake metal fines are oriented in the direction of a magnetic field and a portion in which they are not oriented. These portions exhibit different appearances upon exposure to incident light, providing a recorded state and an erased state. Such materials are disclosed in Jpn. Pat. Appln. Publications Nos. 5-24384 and 9-71042.

The rewritable recording layer 34 in this embodiment is formed by dispersing a phenolic compound having a leuco dye and a long chain alkyl group in a resin, applying it to a PET sheet of 188 $\mu$m in thickness and drying it. The thickness of the resulting rewritable recording layer 34 is about 5 $\mu$m.

The protective layer 35 is formed by applying an ultraviolet hardening resin onto the rewritable recording layer 34 and then hardening it. The thickness of the protective layer is about 5 $\mu$m. In this manner, a sheet-like rewritable recording layer 34 is obtained which is about 200 $\mu$m in thickness and has a very excellent flexibility.

Figure 5:
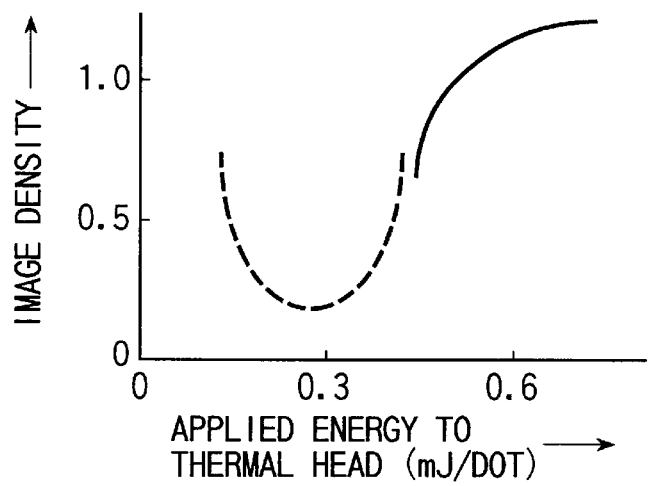
FIG. 5 shows a recording characteristic of a thermal head on the rewritable recording layer of the image recording unit of the information storage media.

Next, reference will be made to FIG. 5 to describe coloring/discoloring characteristics of the rewritable recording layer 34 of the image recording unit 33. In FIG. 5, the image density is plotted against the applied energy to thermal head when a thermal head of a resolution of 8 dots/mm is driven to print a solid pattern on the image recording unit 33 at a feed speed of 40 mm/sec. The image density at the image recording unit is shown on the vertical axis and the energy applied to the thermal head is shown on the horizontal axis. The solid line indicates the density when a thermal energy is applied to record a solid pattern on the image recording unit in the unrecorded state, or in the initial state. This intensity is maintained even after the thermal energy has been removed. The broken line indicates the density when a thermal energy is applied to erase the recorded solid pattern on the image recording unit.

Thus, by changing the applied energy to the thermal head, recording and erasing an image on the image recording unit 33 can be performed repeatedly. In this embodiment, a recording energy is set to 0.6 mJ/dot and an erasing energy is set t 0.3 mJ/dot.

Generally, the rewritable recording layer is erased more sufficiently by being subjected to slow variations in temperature with a heater large in thermal capacity, such as a hot stamp or heat roller, than by being subjected to rapid temperature variations with a thermal head.

To obtain sufficient erasing, therefore, it is desirable to use a heater such as a hot stamp or heat roller. With the material used in this embodiment, erasing is performed to reach the surface of the base member at temperatures of about 65 to 75° C.

The recording medium is cut into pieces each in the form of a label 60 mm long and 30 mm wide. The wireless information storage unit 32 is provided at an end of the opposite side of the PET-sheet-like base member 36 to the side on which the image recording layer 33 is formed.

Although, in this embodiment, the wireless information storage unit is stuck on the rewritable recording medium cut into the form of a label, the wireless information storage medium may be obtained by putting a plurality of wireless information storage units on the surface of a recording medium with a predetermined spacing between adjacent units and then cutting the recording medium into pieces each in the form of a label.

With the wireless information storage medium according to this embodiment, the entire surface of the storage medium can be utilized for an image recording unit because the storage unit and the recording unit are provided on the opposite sides of the base member.

FIGS. 6A and 6B and FIGS. 7A and 7B show a wireless tag as an embodiment of the wireless information storage medium.

Figure 6A:
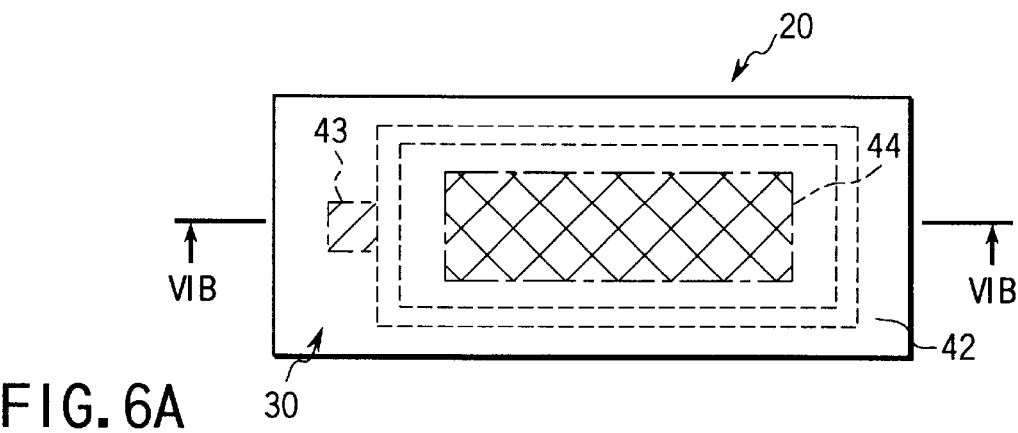
FIG. 6A is a schematic plan view of a wireless article tag as an embodiment of the wireless information storage medium.
Figure 6B:
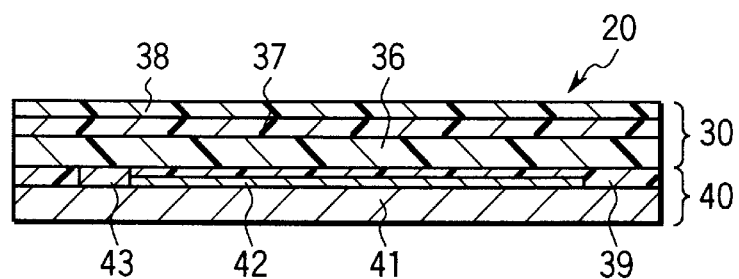
FIG. 6B is a longitudinal sectional view of the wireless information storage medium taken along line A—A of FIG. 6A.

More specifically, FIGS. 6A and 6B are a plan view and a sectional view, respectively, of the wireless information storage medium. As shown in FIG. 6B, the wireless tag 20 is provided with an image recording unit 30 and a wireless information storage unit 40 which are stacked one top of each other. The image recording unit 30, which is a rewritable recording unit allows repeated erasing and recording of visual information by heat, and includes a rewritable recording layer 37 and a top coating 38 which are stacked in sequence on one side of a rectangular base member 36.

The image recording unit 30 is produced by the following processes. A leuco dye and a phenol compound having a long chain alkyl group are dispersed in a resin. A polycarbonate film (base member 36) of about 25 µm in thickness is coated on top with the resin and then dried to form the rewritable recording layer 37 of about 5 µm in thickness. The rewritable recording layer 37 is then coated on top with an ultraviolet-hardened resin. The resin is hardened to form the top coating 38 of about 5 µm in thickness. The rewritable image recording unit 30 of about 35 µm in thickness is obtained in this manner.

Figure 7A:
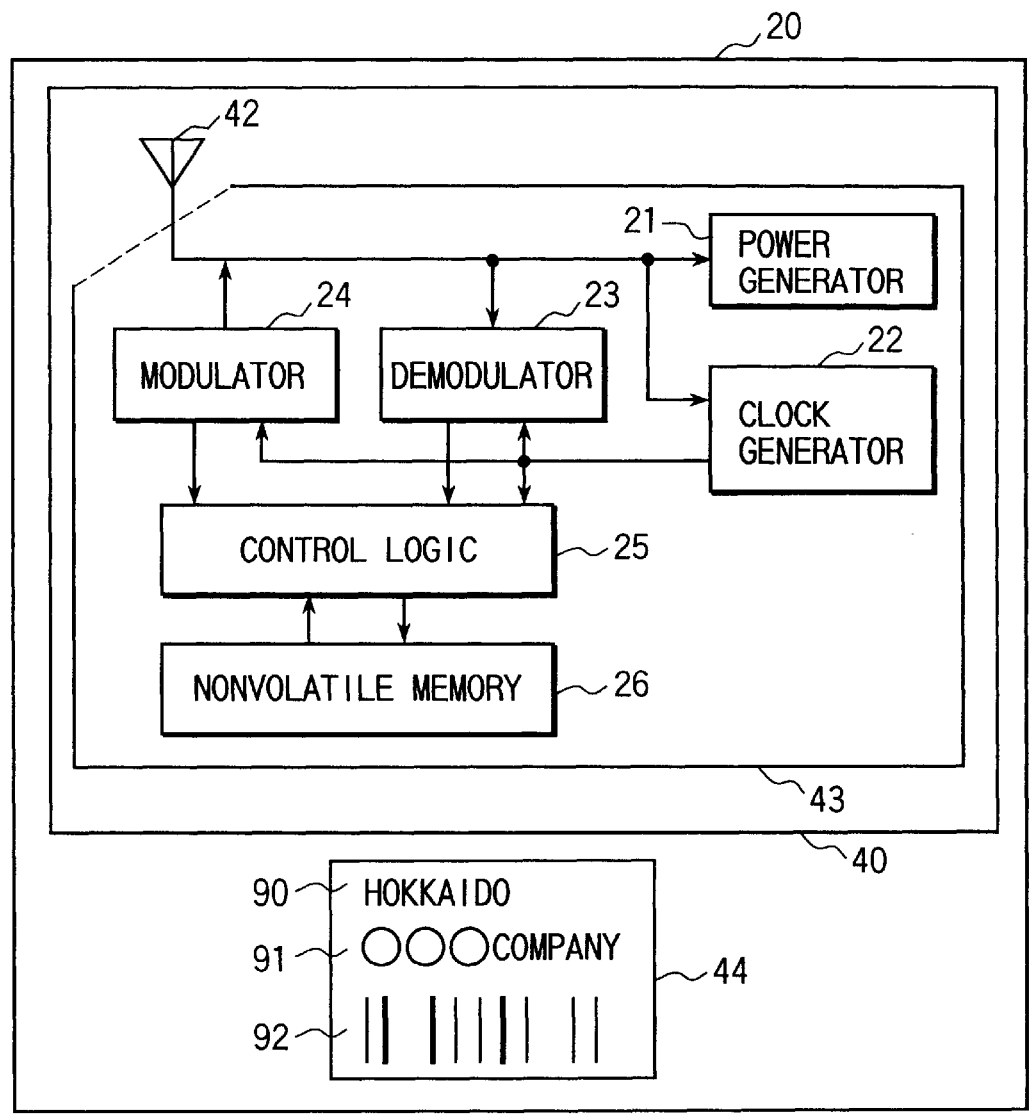
FIG. 7A shows a circuit arrangement and an effective recording area of the wireless article tag shown in FIGS. 6A and 6B.

The wireless information storage unit 40 is composed of a rectangular base member 41, a loop antenna 42 placed on the periphery of the major surface of the base member, and an LSI chip (wireless information storage unit) 43 placed at an end of the major surface of the base member. The LSI chip 43 has a nonvolatile memory and functions as wireless transmission/reception control means that records and reads information in a non-contact manner. As shown in FIG. 7A, the arrangement of the LSI is identical to that described in conjunction with FIG. 3 and thus its description is omitted.

The wireless information storage unit 40 is produced in the following manner. Copper foil is stuck on the surface of a polycarbonate film of about 100 µm in thickness to form a plurality sets of patterns for the loop antenna 42, wirings, and connection pads associated with the LSI chip 43 by means of the PEP method. The antenna pattern is formed on the periphery of the base member 41 as shown in FIG. 6A. The LSI chip connection pad pattern (which, though not shown, is formed on the base member 41 and below the chip 43) is formed so that it will locate at an end of the finished wireless tag 20. The LSI chip is connected to the connection pads by means of die bonding.

The wireless tag 20 is formed by applying an adhesive layer 39 to opposite side of the base member 36 that has the rewritable recording layer and the side of the base member 41 on which the wireless information storage unit is formed.

Figure 7B:
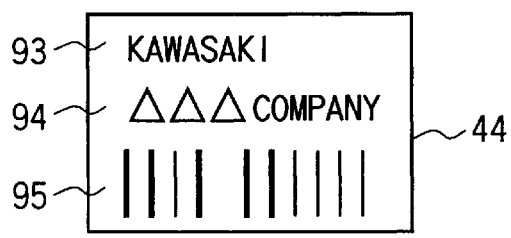
FIG. 7B shows the effective recording area of the wireless tag.

The rewritable recording layer 37 has an effective recording area 44 inside the antenna 42 as shown in FIG. 6A. The effective recording area 44 and the LSI chip 43 are separated from each other for the length of the tag. FIGS. 7A and 7B illustrate the printed information on the effective recording area 44.

Although a rewritable recording layer is used for the image recording unit, any other recording layer, such as an ink-jet recording layer, a thermal recording layer, or the like, can be used.

The wireless information storage medium of this embodiment provides excellent flexibility because each of the wireless information storage element and the image recording unit is formed in the form of a thin sheet. Further, since the wireless information storage unit is built into the base member, the medium is formed in the form of a label. Thus, even when in contact with other objects, the wireless information storage medium will never get snagged.

With the wireless information storage medium structured such that the surface on which the LSI chip or the antenna is placed is coated, the recording layer 37 is not in direct contact with an irregular surface due to the LSI chip or antenna. Thus, irregularities of the surface of the image recording unit can be reduced. In the case of a contact recording system such as thermal recording, stable, clear images can be formed. When the LSI chip, antenna substrate and the image recording layer substrate are bonded, the advantage is obtained particularly.

FIG. 8 is a sectional view of a wireless information storage medium according to still another embodiment. A wireless information storage unit 51 is composed of a loop antenna 53 placed in the periphery of one side (lower side) of a first base member 52 in the form of a cut sheet and a wireless information storage element 54 placed at an end of that side. The wireless information storage element 54 is the same in arrangement as that in the previously described embodiment and hence its description is omitted.

An image recording unit 56 is formed of a rewritable recording layer 58 and a protective layer 59 which are sequentially formed on one side (upper side) of a third base member 57 in the form of a cut sheet.

The wireless information storage unit 51 is produced as follows. Copper foil is stuck on one surface of a polycarbonate film (base member 52) of about 100 μm in thickness and a plurality of patterns for the loop antenna, wirings, and pads for connection between the LSI chip terminals and the wirings are formed in the copper foil by means of the known PEP method. The loop antenna pattern is formed in the periphery of the first base member 52.

The connection pad pattern of the LSI chip (wireless information storage element 54) is formed so that it will locate at an end of each wireless information storage medium as shown in FIG. 6B when the base member is cut to separate the wireless information storage units 51 from one another. The LSI chip is die bonded to the connection pads.

That surface of the first base member 52 on which the antenna 53 and the wireless information storage element 54 is covered with a second base member 55 in the form of a cut sheet. A filler (resin) 60 is filled between the base members 52 and 55 to bond them.

The image recording unit 56 is formed as follows. A leuco dye and a phenol compound having a long chain alkyl group are dispersed in a resin. The resin is spread on the surface of a polycarbonate film (third base member 57) of about 25 μm in thickness and then dried to form the rewritable recording layer 58 of about 5 μm in thickness. The leuco dye and the phenol compound used for forming the rewritable recording layer 58 were described previously and hence their descriptions are omitted here.

An ultraviolet-hardened resin is spread on the rewritable recording layer 58 thus formed and then hardened to form the protective layer 59 of about 5 μm in thickness. In this manner, the rewritable recording layer 58 of about 35 μm in thickness is obtained. The image recording unit 56 and the wireless information storage unit 51 are bonded with the filled adhesive layer 60.

The base member is cut into pieces each in the form of a label 600 mm long and 30 mm wide. Each piece has a wireless information storage element 54 and an antenna 53. With the wireless information storage medium, the wireless information storage element 54 and the antenna 53 are placed on one side of the first base member 52 and covered with the second base member 55. The rewritable recording layer 58 is formed on one side of the third base member 57. The other side of the third base member 57 and the other side of the first base member 52 are stuck together.

Although the third and first base members are bonded, the third base member and the second base member may be stuck together. Although a rewritable recording layer is used for the image recording unit any other recording layer, such as an ink-jet recording layer, a thermal recording layer, or the like, can be used.

With the wireless information storage medium of this embodiment, the recording layer substrate 52 is not in direct contact with an irregular surface due to the LSI chip or antenna. Thus, irregularities of the surface of the image recording unit can be reduced. In the case of a direct contact recording system such as thermal recording, stable, clear images can be formed. When the LSI chip and antenna substrate 50 and the image recording layer substrate 57 are bonded, the advantage is obtained.

FIG. 9 is a sectional view of a wireless information storage medium according to still another embodiment. In this figure, 61 denotes a sheet base member which is provided at an end of its one side with a disc type of wireless information storage unit 62 and on its other side with an image recording unit 63. The image recording layer 63 is composed of a rewritable recording layer 64 and a protective layer 65.

FIGS. 10A and 10B are a plan view and a sectional view, respectively, of the wireless information storage unit 62. This storage unit has a circular antenna 71 and a wireless information storage element 72 interposed between circular plastic substrates 73 and 74 as shown in FIG. 10B and is formed as an isolated part.

A through hole 75 is formed in the center of the wireless information storage unit 62. The storage unit is stuck on the base member 61 so that the through hole 75 is aligned with a through hole 66 formed in the base member 61 at its end. The storage element 72 remains unchanged from the storage unit 21 in the previous embodiment and hence its description is omitted.

The base member 61 may be made of plastic, such as polyethylene terephthalate (PET), vinyl chloride, or the like, or synthetic paper. Here, a white PET film of about 190 μm in thickness is used.

The image recording unit 63 is formed on the other side of the base member 61 as follows. A leuco dye and a phenol compound having a long chain alkyl group are dispersed in a resin. The resin is spread on the surface of the white PET film (base member 61) and then dried to form the rewritable recording layer 58 of about 5 μm in thickness. The leuco dye and the phenol compound used for forming the rewritable recording layer 58 were described previously and hence their descriptions are omitted here.

An ultraviolet-hardened resin is spread on the rewritable recording layer 64 thus formed and then hardened to form the protective layer 65 of about 5 μm in thickness. In this manner, the rewritable recording layer 64 which is about 200 μm in thickness and exhibits excellent flexibility is obtained.

Next, a plurality of wireless information storage units 62 are arranged at regularly spaced intervals along an end of the opposite side of the base member to the side on which the image recording layer 63 is formed. Through holes 66 are formed in the base member 61 and the image recording layer 63 so that each hole aligns with a corresponding one of the holes 62 in the wireless information storage units 62 as shown in FIG. 9. To separate the wireless storage units 72 from one another, the base member is cut into pieces in the form of a label 60 mm long and 30 mm wide.

In this manner, a wireless information storage medium is obtained in which a disc type wireless information storage unit 62 having a through hole 75 at its center is stuck on a thin-sheet-like base member 61 having a through hole 66 so that both the holes 75 and 66 align with each other.

With the wireless information storage medium of this embodiment, since the wireless information storage unit is circular, even if it protrudes from the base member, it will not catch in something upon contact. Since it resembles an existing price tag in appearance, it can be attached to an article in the same manner as previously discussed.

Figure 11A:
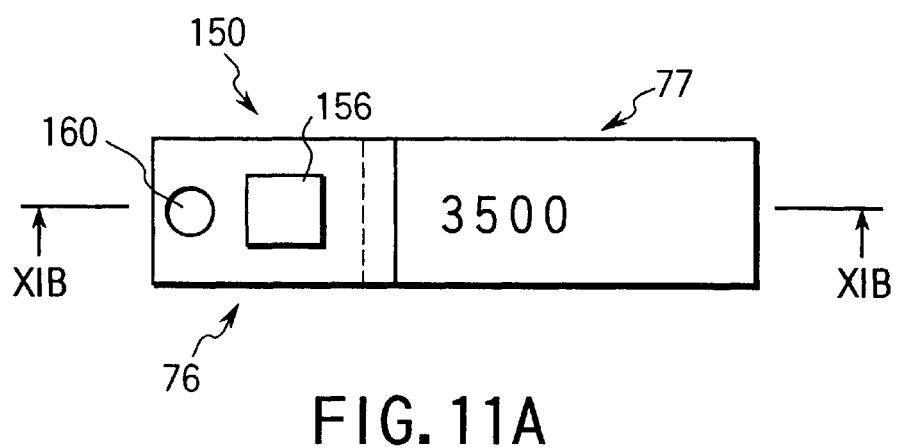
FIGS. 11A, 11B and 11C show a wireless price tag as an embodiment of the wireless information storage medium.
Figure 11B:
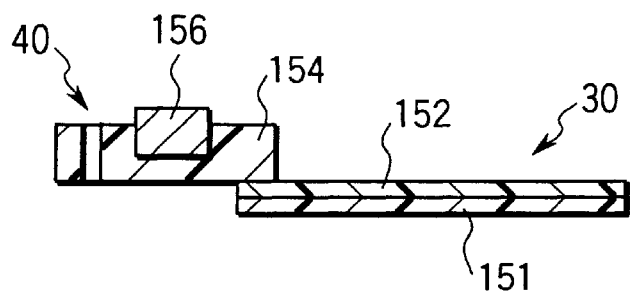
Figure 11C:
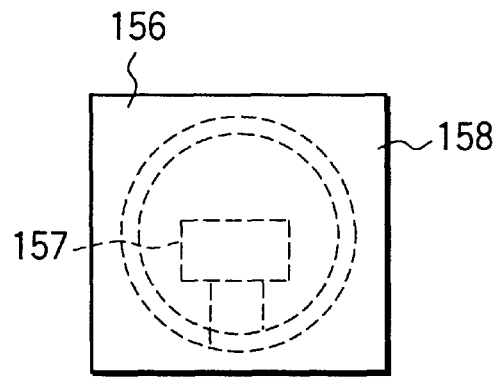

FIGS. 11A, 11B and 11C show a wireless price tag as an embodiment of the wireless information storage medium. The wireless price tag, indicated collectively at 150, comprises a wireless information storage unit 76 and an image recording unit 77 each of which is rectangular. By coupling the storage unit 76 and the recording unit 77 at their short side, the storage medium is formed into the form of a long rectangle as a whole.

An image recording unit 77 is composed of a rectangular-sheet like base member 151 and a rewritable recording layer 152 formed on the base member. A wireless information storage unit 76 has a rectangular base member 154 on which a wireless information storage element 156 is fixed. The storage element comprises an LSI chip 157 and a loop antenna 158. The base member 154 is formed with a through hole 160 for attachment to an article.

Next, a wireless information storage medium issuing method and apparatus of the present invention will be described in terms of the wireless tag shown in FIGS. 6A, 6B, 7A and 7B.

Figure 12:
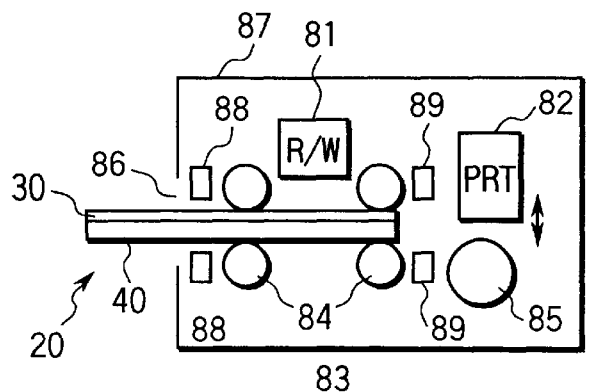
FIG. 12 is a schematic sectional view of a first embodiment of an issuing apparatus of the present invention.

FIG. 12 is a schematic sectional view of an issuing apparatus according to a first embodiment of the present invention. The apparatus has a casing 87 that includes an insertion/ejection port 86 through which a wireless tag 20 is inserted and ejected. Located within the casing 87 is a reader/writer (R/W) 81 for reading from and writing into the wireless information storage unit 40 in the wireless tag 20 in a non-contact manner and an image printer (PRT) 82 for erasing old information and recording new information on the effective recording area 44 of the image recording unit 30 of the wireless tag. The reader/writer 81 and the image printer 82 are disposed serially with respect to the insertion/ejection port 86. That is, the reader/writer 81 is located between the port 86 and the printer 82.

Two pairs of carrying rollers 84, located within the casing, constitute a carrying means 83 for carrying the wireless tag 20 inserted into the port 86 to the reader/writer 81 and the printer 82 and ejecting the tag 20 through the port 86 from the casing. The carrying means 83 is further provided with a platen roller 85 which is located opposite of the thermal head in the printer 82.

In the vicinity of the insertion/ejection port 86 of the casing 87 is a first sensor 88 which detects the insertion or ejection of the wireless tag 20 into or from the apparatus. A second sensor 89 is located between reader/writer 81 and the printer 82 and detects when the wireless tag 20 is fed into the printer 82.

Figure 13:
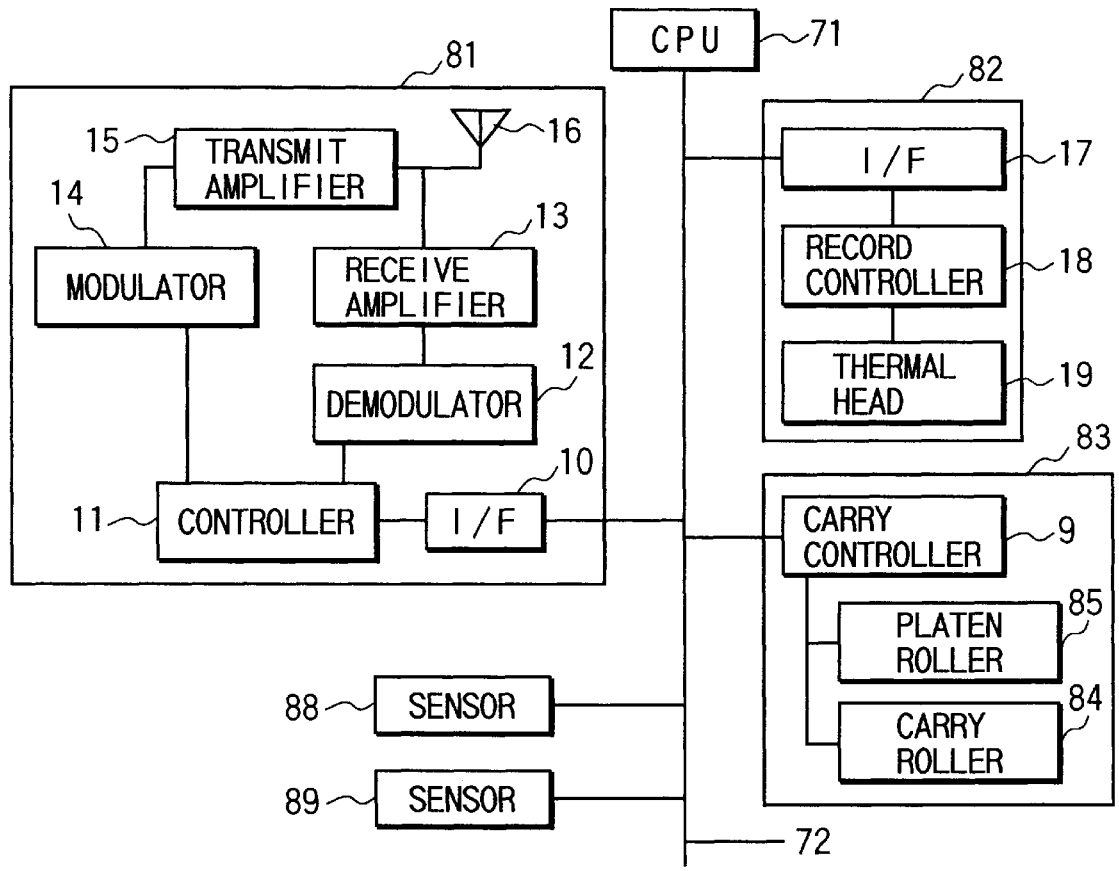
FIG. 13 is a block diagram of the issuing apparatus of FIG. 12.

FIG. 13 is a block diagram of the issuing apparatus of FIG. 12. The reader/writer 81 includes an I/F 10, a controller 11 including a CPU, a RAM, and a ROM, a demodulator 12, a receive amplifier 13, a modulator 14, a transmit amplifier 15, and an antenna 16.

The printer 82 comprises an I/F 17, a controller 18, and a line type of thermal head 19. The head is substantially equal in width to the effective recording area 44 and is positioned in a place where the effective recording area passes.

The carrying means 83 comprises a controller 90, two sets of rollers 84, and the platen roller 85. The two sets of rollers 84 carry the wireless tag while sandwiching only its both ends in the direction of width. That is, the LSI chip 43 is kept away from the rollers. The platen roller 85 is substantially equal in width to the thermal head 19 and is opposed to the head.

The issuing apparatus includes a CPU 71 for controlling the entire apparatus. The CPU 71 is connected by a bus 72 to the reader/writer 81, the printer 82, the carrying means 83, and the first and second sensors 88 and 89.

Next, the wireless tag issuing method implemented by the above-described apparatus will be described with reference to FIGS. 12 and 13 and FIGS. 14 to 17.

Figure 14:
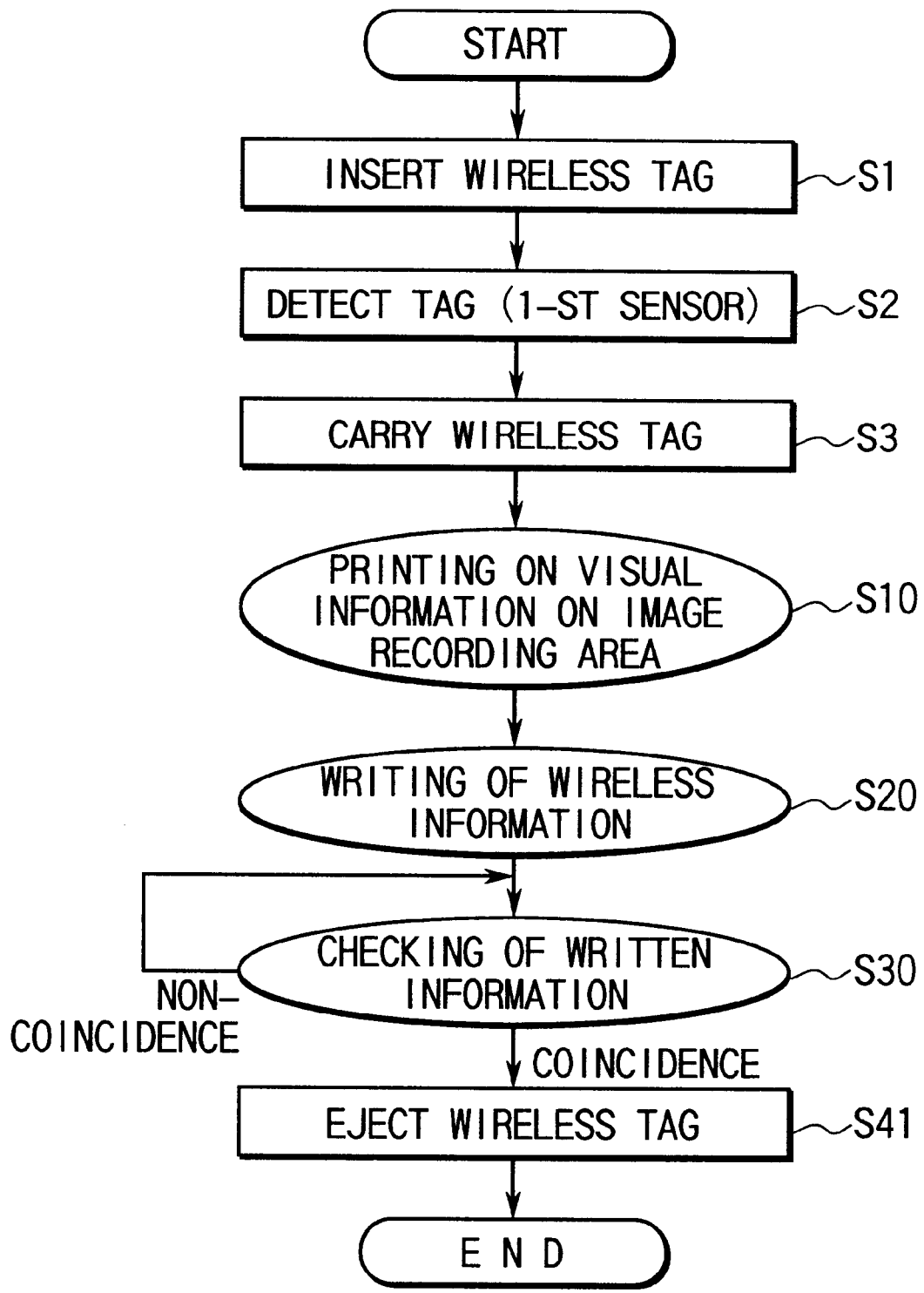
FIG. 14 is a simplified flowchart for the issuing operation of the apparatus of FIG. 12.

FIG. 14 is a flowchart illustrating an outline of the issuing procedure. In this embodiment, visual information is printed on the image recording unit 30 of a wireless tag 20 in step S10, information sent by radio is written into the wireless information storage unit in the tag 40 in step S20, and the written information is checked to issue the wireless tag in step S30.

In more detail, the wireless tag 20 is first inserted through the insertion/ejection port 86 into the casing 87 of the issuing apparatus with its effective recording area 44 placed at the head (step S1). When the first sensor 88 detects the wireless tag (step S2), the CPU 71 outputs a carrying signal to the carrying controller 90. The controller 90 then activates a carrying driver that is not shown to rotate the carrying rollers 84 and the eject roller 85, thereby, carrying the wireless tag 20 to the printer 82 at a given speed (step S3). In subsequent step S10, visual information is printed.

Figure 15:
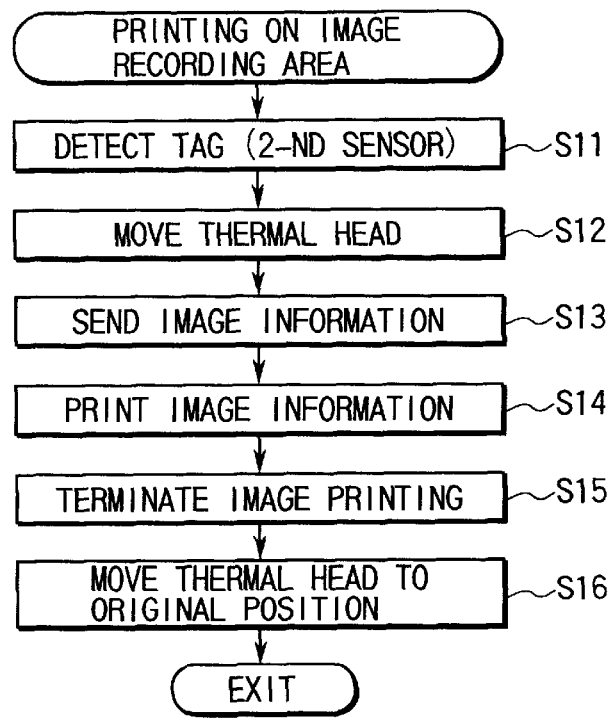
FIG. 15 is a flowchart for the image printing operation of the issuing apparatus of FIG. 12.

FIG. 15 is a detailed flowchart for the printing operation of the printer 82. When the second sensor 29 detects the feed of the wireless tag 20 into the printer 82, the thermal head 19 moves downward from a place where it does not come into contact with the tag 20 to a place where it comes into contact with the tag. In corporation with the platen roller 85, the thermal head 19 comes into contact with the effective recording area 44 with pressure (step S12).

The CPU 71 transfers visual information to the recording controller 18 via the I/F 17 (step S13). The information includes, as shown in FIG. 7A, destination information "HOKKAIDO", recipient information "000 COMPANY", bar-code information concerning an article to which the wireless tag 20 is to be attached, recordeding position information, etc.

When the wireless tag 20 further moves and the recording starting position of its effective recording area 44 of the image recording unit 30 reaches the thermal head 19, the recording controller 18 drives each heated element of the thermal head 19 in accordance with predetermined conditions. As a result, information already printed on the effective recording area as shown in FIG. 7B, the destination 80 "KAWASAKI", the recipient 81 "000 COMPANY", and the bar code 82, is rewritten through the use of an overwriting technique to be described later by the destination 90 "HOKKAIDO", the recipient 91 "000 COMPANY", and the bar code 92 (step S14) as shown in FIG. 7A. The coloring (recording) and discoloring (erasing) characteristics of the rewritable recording layer 37 of the image recording unit 30 of the wireless tag 20 remain unchanged from those shown in FIG. 5.

Figure 18:
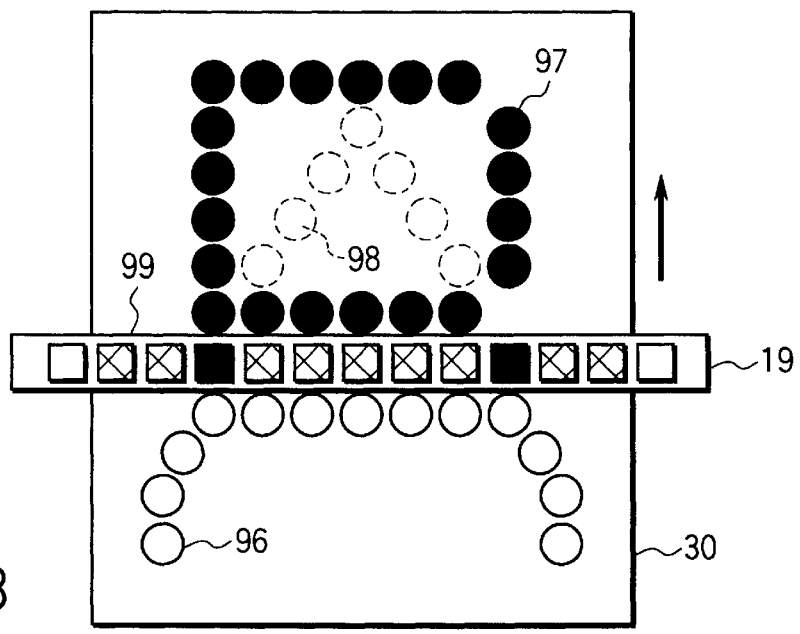
FIG. 18 is a diagram for use in explanation of overwrite recording by a thermal head.

FIG. 18 shows the manner in which the line type thermal head 19 rewrites information that is already recorded. In this example, an existing image 92, an alphabetic character "A", recorded on the image recording unit 30 of the wireless tag 20 is rewritten by a new image 97, an alphabetic character "B", by heating the recording unit by a string of heated elements 99 of the thermal head 19 while moving the tag in the direction of an arrow. In this figure, each of dots of the existing image is indicated by a white dot, while each dot of the new image is indicated by a black dot.

The thermal head 19 is controlled for each heated element 99. The applied energy to each heated element 99 is selectively switched to a recording energy and an erasing energy in accordance with image information to be printed. The heated elements supplied with the recording energy are each indicated by a black square, whereas the heated elements supplied with the erasing energy are each indicated by a square with oblique lines.

Of the image recording unit 30, in the area which is not heated yet by the heated elements 99 (the lower area in FIG. 18) there are left existing dots 96 indicated by white dots. In the area which has been already heated, however, the recording heat has been applied to new image portions and the erasing heat has been applied to existing image portions to be erased. Thus, portions of an existing image that do not overlap a new image have been erased simultaneously with recording of the new image 97 as indicated by dotted dots. Therefore, any existing image 92 can be rewritten by a new image 97 no matter how the existing image 92 has been recorded. Upon termination of the recording of the image information (step S15), the thermal head 19 returns to the original position, thereby releasing the pressure contact with the wireless tag 20 (step S16). Thus, the printing of image information on the image recording unit 30 terminates.

In the wireless tag 20, the effective recording area 44 and the LSI chip 43 are separated from each other in the direction of length of the tag. Since, as described previously, the wireless tag 20 is fed into the printer 82 with the effective recording area side at the head, the LSI chip 43 will never come into contact with the thermal head 19. That is, the LSI chip 43 will never be subjected to mechanical and thermal stress by the thermal head.

Figure 16:
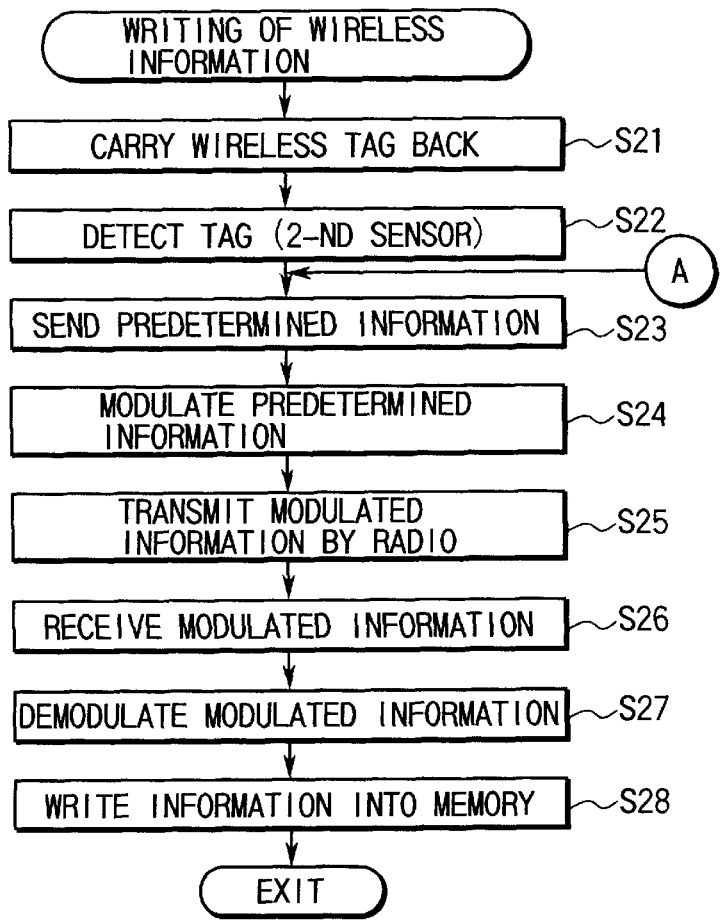
FIG. 16 is a flowchart for the wireless information writing operation of the apparatus of FIG. 12.

After the printing of image information, information sent by radio is written into the memory of the wireless tag 20. FIG. 16 is a detailed flowchart for the operation of writing information sent by radio into the memory of the wireless tag 20. Upon termination of printing by the printer, the carrying controller 90 reverses the rotation of the rollers 84 and 85 to carry the tag back in the direction of the insertion/ejection port 86 in step S21.

When the second sensor 89 detects the trailing edge of the tag 20 on the recording area side (step S22), the tag is carried to the position where it is opposed to the antenna 16 of the reader/writer 81 after a lapse of a predetermined time from the time at which the second sensor produced a detected signal. Then, the CPU 71 sends information to the reader/writer 81 (step S23). Here, destination information "HOKKAIDO", recipient information "000 COMPANY", and information concerning an article to which the tag is to be attached are sent from the CPU 71 to the controller 11 comprised of CPU, RAM, and ROM.

The information from the controller 11 is subjected in the modulator 14 to modulation suitable for transmission by radio (step S24) and the modulated information is transmitted from the antenna 16 through the transmit amplifier 15 (step S25).

The transmitted information is received by the antenna 42 of the wireless tag 20 (step S26). The received signal is rectified and stabilized in the power generator 21 to apply a supply voltage to the LSI chip 43. The received signal is also demodulated in the demodulator 23 (step S27). The demodulated information is written into the nonvolatile memory 26 through the control logic 25 in such a way as to overwrite old information therein (step S28). In this manner, information is written into the wireless information storage unit 40.

Figure 17:
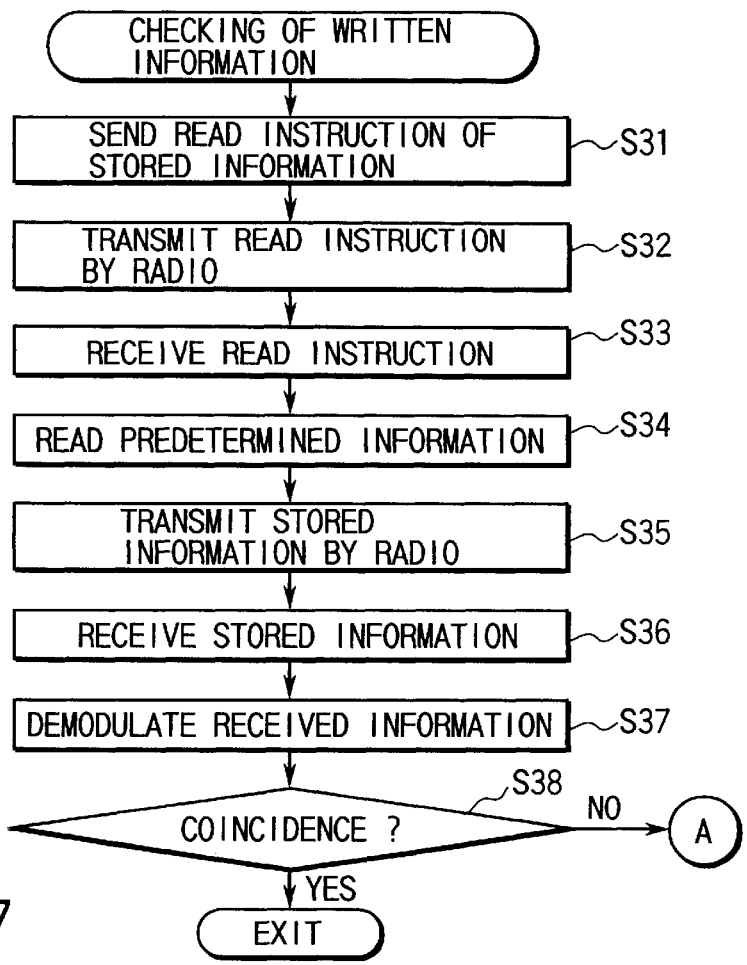
FIG. 17 is a flowchart for the checking operation of the apparatus of FIG. 12.

Subsequently, a checking operation is performed to verify that data has been written correctly. FIG. 17 is a detailed flowchart for this checking operation. After data has been written into the storage unit 40, the CPU 71 sends a read instruction to the reader/writer 81 (step S31). The reader/writer modulates the read instruction in the modulator 14 for transmission to the wireless tag 20 (step S32). Upon receipt of the read instruction (step S33), the wireless tag decodes it and then reads the stored information from the nonvolatile memory 26 (step S34), the information including the destination information "HOKKAIDO", the recipient information "000 COMPANY", and the article information.

The read information is modulated in the modulator 24 and then transmitted from the antenna 42 (step S35). The transmitted information from the wireless tag is received by the antenna 16 (step S36) and then demodulated in the demodulator 12 after being amplified by the receive amplifier 13 (step S37). The demodulated information is sent through the controller 11 and the I/F 10 to the CPU 71, where the demodulated information is checked with the previously written information (step S38).

When a match occurs between the demodualted information and the previously written information, the electronic tag 20 is ejected from the insertion/ejection port 86 in step S41 of FIG. 14. If no match occurs, then the procedure returns to step S23 of FIG. 16 to repeat the information writing steps beginning with step S23 and the subsequent checking steps.

As described above, the wireless tag issuing apparatus of this embodiment has the insertion/ejection port 86, the reader/writer 81 and the printer 82 placed in the order mentioned, prints image information on the effective recording area 44 of the wireless tag fed from the insertion/ejection port with the effective recording area at the head by the printer 82, and writes predetermined information into the wireless information storage unit 40 in a non-contact manner by the reader/writer 81. Therefore, stored information in the wireless information storage unit 40 and image information on the image recording unit 30 can be overwritten without imposing mechanical stress on the LSI chip 43 i.e., as an electronic component. That is, the LSI chip can avoid being damaged at the time of issuing or reissuing wireless tags. In addition, even when the thermal head 19 prints the image information, heat will not be directly transferred to the wireless information storage unit, preventing written information from being destroyed by heat. Thus, the reliability and safety of issuing the wireless tag can be increased.

Moreover, the use of the thermal head-based overwrite recording permits one single printer to print and erase visual information, reducing the size of the entire apparatus.

Figure 19:
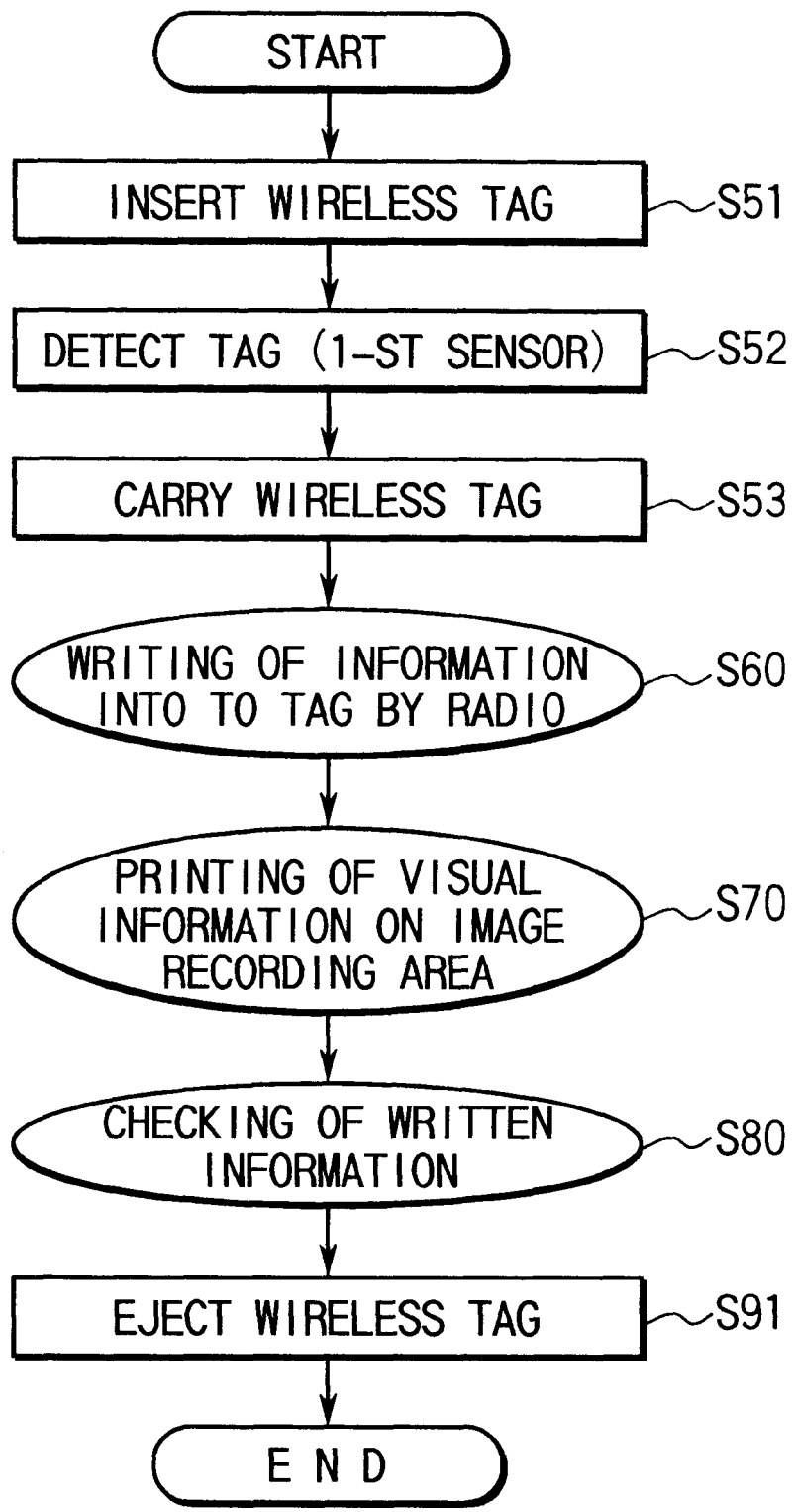
FIG. 19 is a simplified flowchart illustrating the issuing method of the apparatus of FIG. 19.

Next, another embodiment of the wireless tag issuing method of the present invention will be described. FIG. 19 is a flowchart illustrating an outline of the issuing operation of this embodiment. This method describes immediately checking the information written into the wireless information storage unit 40 after printing the image information on the image recording unit 30 of the wireless tag 20. As shown is FIG. 19, the procedure is performed in the order of writing of information into the wireless information storage unit 40 (step S60), printing of visual information on the image recording unit 30 (step S70), and checking of the written information (step S80). This issuing method is implemented using the same issuing apparatus as that shown in FIGS. 12 and 13.

As shown in FIG. 19, the wireless tag 20 is first inserted through the insertion/ejection port 86 into the casing 87 of the issuing apparatus with its effective recording area 44 placed at the head (step S51). When the first sensor 88 detects the wireless tag (step S52), the CPU 71 outputs a carrying signal to the carrying controller 90. The controller then activates a carrying driver that is not shown to rotate the carrying rollers 84 and the eject roller 85, thereby, carrying the wireless tag to the printer 82 at a given speed (step S53).

When the wireless tag is carried to a place where it is opposite to the antenna 16 of the reader/writer 81 and after a lapse of predetermined time extending from when the first sensor 88 produced a detected signal, information sent by radio is written into the wireless information storage unit 40 to overwrite old information (step S60).

Figure 20:
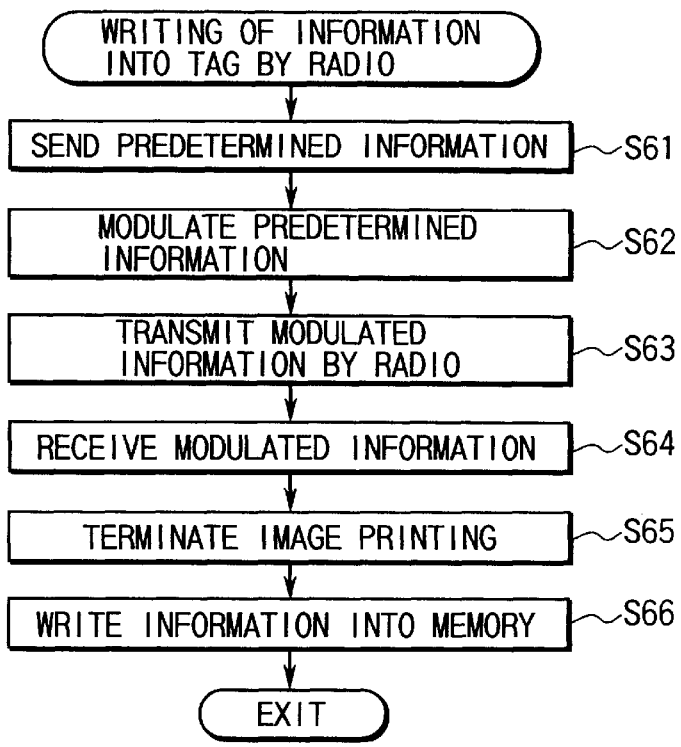
FIG. 20 is a flowchart illustrating the information writing operation in the issuing method of FIG. 19.

FIG. 20 is a detailed flowchart for the operation of writing information by radio. Predetermined wireless information, which, in this example, includes destination information "HOKKAIDO", recipient information "000 COMPANY", and article information, is sent from the CPU 71 through the I/F 10 to the controller 11 (step S61). Data from the controller 11 is modulated in the modulator 14 (step S62). The modulated information is sent by radio from the antenna 16 to the wireless tag 20 (step S63).

The modulated information signal is received by the antenna 42 of the wireless tag 20 (step S63). In response to the received signal the power generator 21 supplies a supply voltage to the LSI chip 43. The received signal is demodulated in the demodulator 23 (step S65) and then overwrites old information in the memory 26 (step S66). Thus, the writing of information into the wireless information storage unit 40 terminates.

Figure 21:
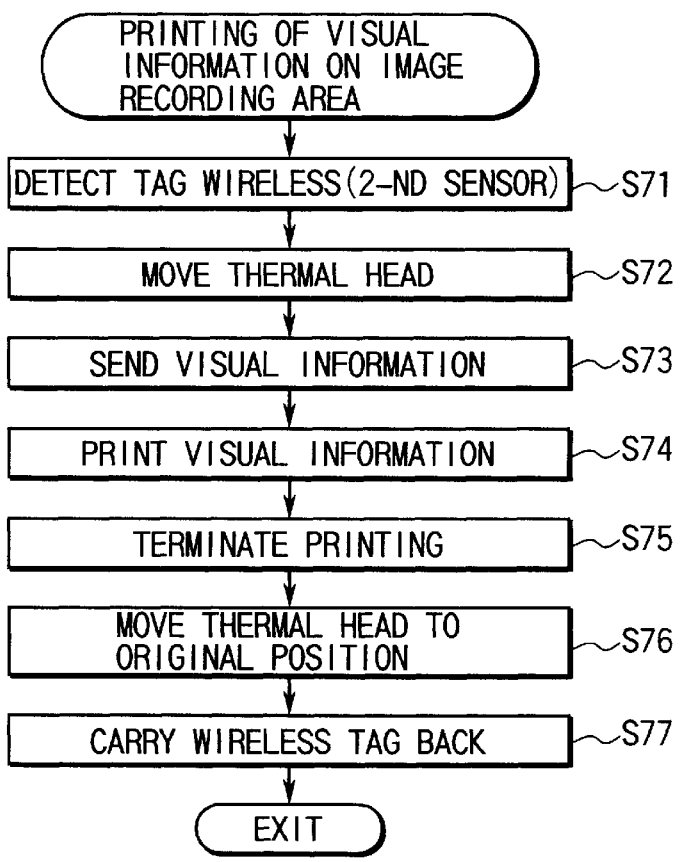
FIG. 21 is a flowchart illustrating the image printing operation in the issuing method of FIG. 19.

Next, printing of visual information on the image recording unit is performed. FIG. 21 is a flowchart for the visual information printing operation. When the second sensor 29 detects the entry of the wireless tag 20 into the printer (step S71), the thermal head 19 moves downward from a place where it does not come into contact with the tag 20 to a place where it comes into contact with the tag 20. In corporation with the platen roller 85, the thermal head 19 comes into contact with the effective recording area 44 with pressure (step S72).

The CPU 71 transfers visual information to the recording controller 18 via the I/F 17 (step S73). In this example, the information includes destination information "HOKKAIDO", recipient information "000 COMPANY", bar-code information indicating part of information concerning an article to which the wireless tag 20 is to be attached, and recorded position information.

When the wireless tag 20 further moves and the recording starting position of its effective recording area 44 of the image recording unit 30 reaches the thermal head 19, the recording controller 18 drives the thermal head 19 in accordance with predetermined conditions. As a result, information is already printed on the effective recording area 44 as shown in FIG. 7B, the destination information 93 "KAWASAKI", the recipient information 94 "000 COMPANY", and the bar code 95, is rewritten through the use of an overwriting technique to be described later by destination information 90 "HOKKAIDO", recipient information 91 "000 COMPANY", and bar code 92 (step S74) as shown in FIG. 7A.

Upon termination of the recording of the image information, the thermal head 19 returns to the original position, thereby releasing the pressure contact with the wireless tag (step S76). The carrying controller 90 reverses the rotation of the rollers 84 and 85 to carry the tag in the direction of the insertion/ejection port 86 (step S77). Thus, the printing of image information on the image recording unit 30 terminates.

Figure 22:
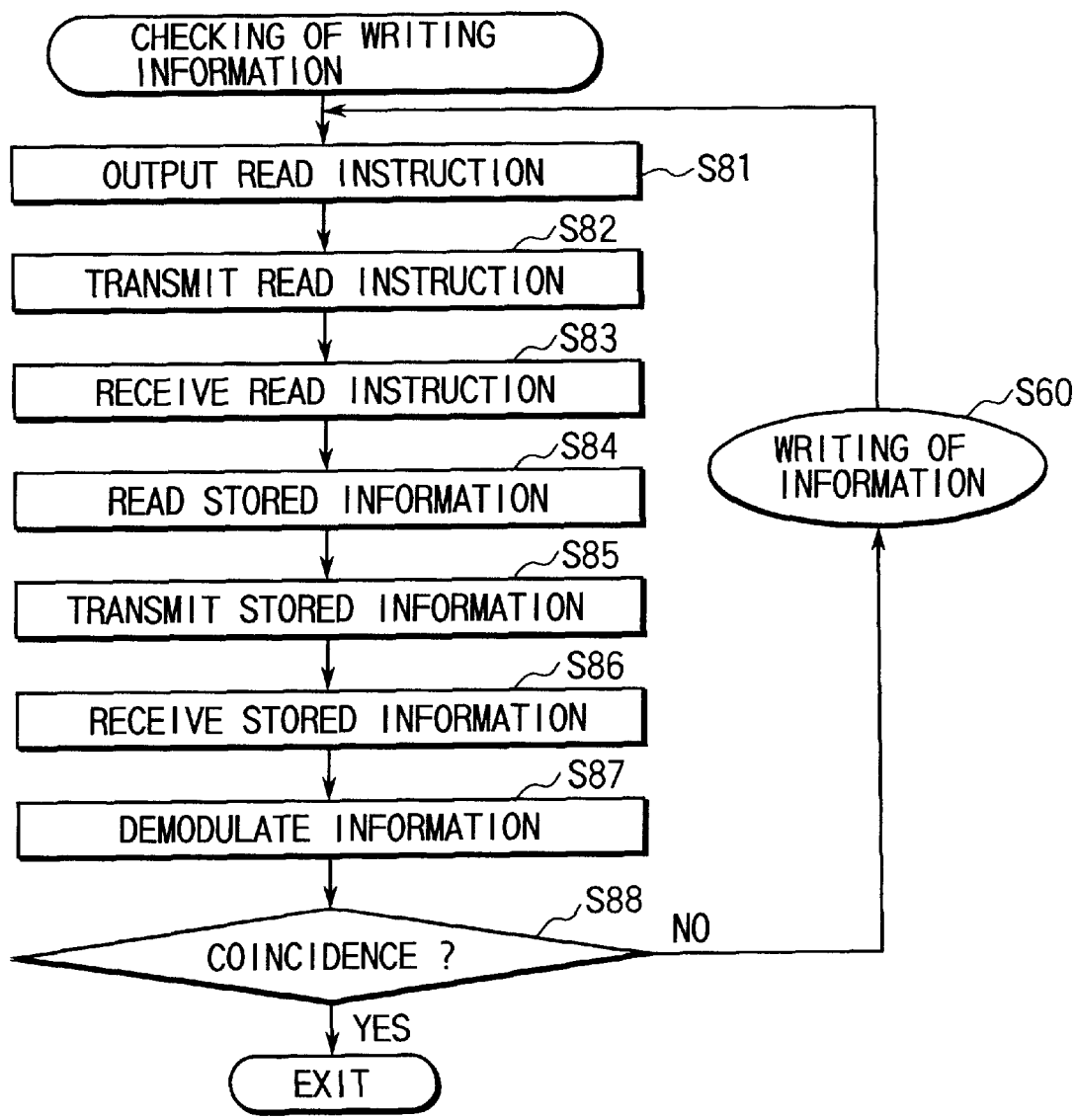
FIG. 22 is a flowchart illustrating the checking operation in the issuing method of FIG. 19.

After the printing of visual information, the wireless tag 20 is carried to the position in which it is opposite to the antenna 16 of the reader/writer 81 after a lapse of a predetermined time from the time at which the second sensor 89 detected the trailing edge of the tag. The information stored in the wireless information storage unit 40 of the tag is read and then checked with the information previously used in writing. FIG. 22 is a detailed flowchart for the checking operation.

The CPU 71 sends a read instruction to the reader/writer 81 (step S81). The reader/writer sends the read instruction to the wireless tag 20 by radio (step S82). Upon receipt of the read instruction (step S83), the wireless tag 20 reads the previously stored information from the nonvolatile memory 26 (step S84), the information including the destination information "HOKKAIDO", the recipient information "000 COMPANY", and the article information.

The read information is modulated in the modulator 45 and then transmitted from the antenna 42 (step S85). The transmitted information from the wireless tag is received by the antenna 16 (step S86) and then recovered in the demodulator 12 after being amplified by the receive amplifier 13 (step S87). The recovered information is sent through the controller 11 and the I/F 10 to the CPU 71, where the recovered information is checked with the previously written information (step S88).

When a match occurs between the recovered and the previously written information, the electronic tag 20 is ejected from the insertion/ejection port 86 (step S91). If no match occurs, then the procedure returns to step S23 of FIG. 16 to repeat the information writing steps beginning with step S23 and the subsequent checking steps.

According to the issuing method of this embodiment, immediately after printing of visual information, a check is made on previously written information to determine whether or not the information has been written correctly. Thus, wireless information storage media can avoid being issued if information was not written correctly or the stored information is damaged.

Accordingly, a wireless tag issuing method and apparatus permits wireless information storage media to be issued without damaging an built-in electronic component.

The present invention may be implemented in still other ways without departing the scope and spirit thereof. For example, the wireless information storage medium may take any other form, for example, a price tag.

Next, an issuing method and apparatus for issuing wireless information storage media stored with digital information and printed with visual information in large quantities. In the issuing apparatus of this embodiment, a wireless information writing apparatus and a visual information printer are independent of each other as will be described later. The wireless information storage media produced by the apparatus are wireless article tags 20 shown in FIGS. 6 and 7.

Figure 23:
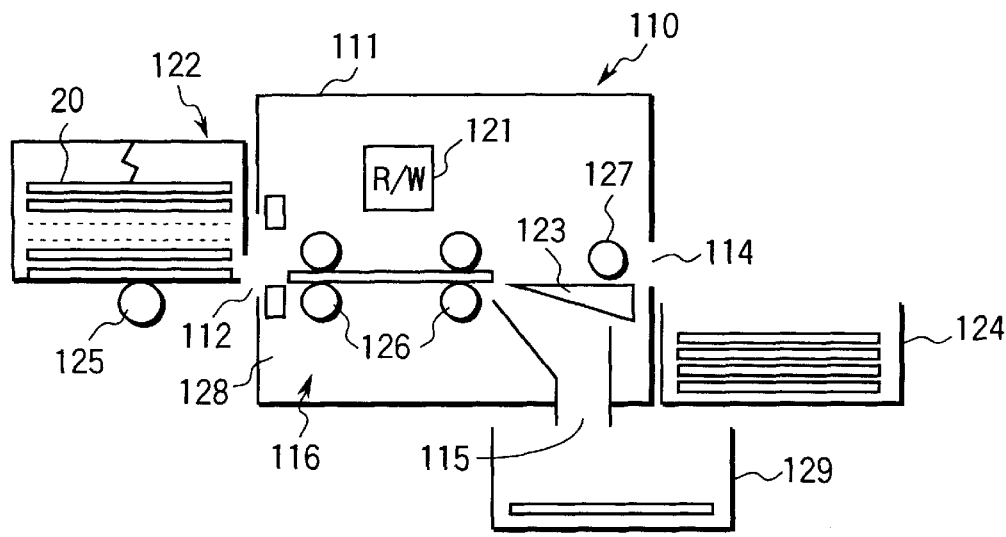
FIG. 23 is a schematic sectional view of a wireless information writing apparatus according to a second embodiment of the issuing apparatus of the present invention.

As shown in FIG. 23, a wireless information writing apparatus 110 in the issuing apparatus of this embodiment has a casing 111, which is formed with an insertion port 112 which accepts a wireless tag 20 an ejection port 112 which ejects a wireless tag 20 that has predetermined information written normally, and a recall port 115 for recalling wireless tags for which abnormality was detected.

Outside the casing 111 is provided a stacker 122 in which unprocessed wireless tags 20 are stocked. The stacker is located opposite to the insertion port 112. At the bottom of the stacker, a take-out roller 125 is adapted to insert the wireless tags 20, one at a time, into the port 112. Found outside the casing, is a collect box 124 which collects wireless tags 20 ejected from the ejection port 114 and a recall box 129 which recalls wireless tags 20 ejected from the recall port 115.

Located within the casing, is a reader/writer (R/W) 121 which uses the radio to write into and read from the wireless information storage unit 40 of the wireless tag 20 and two sets of rollers 126 adapted to carry the wireless tag to the reader/writer 121 at a given speed. Also within the casing, is a flipper 123 adapted to selectively feed the wireless tag passed the reader/writer 121 to the ejection port 114 or the recall port 115, an ejection roller 127 adapted to eject the wireless tag 20 from the ejection port 114, and a sensor 128 positioned in the vicinity of the insertion port 112 for detecting the insertion of a wireless tag 20 into the apparatus 110.

Figure 24:
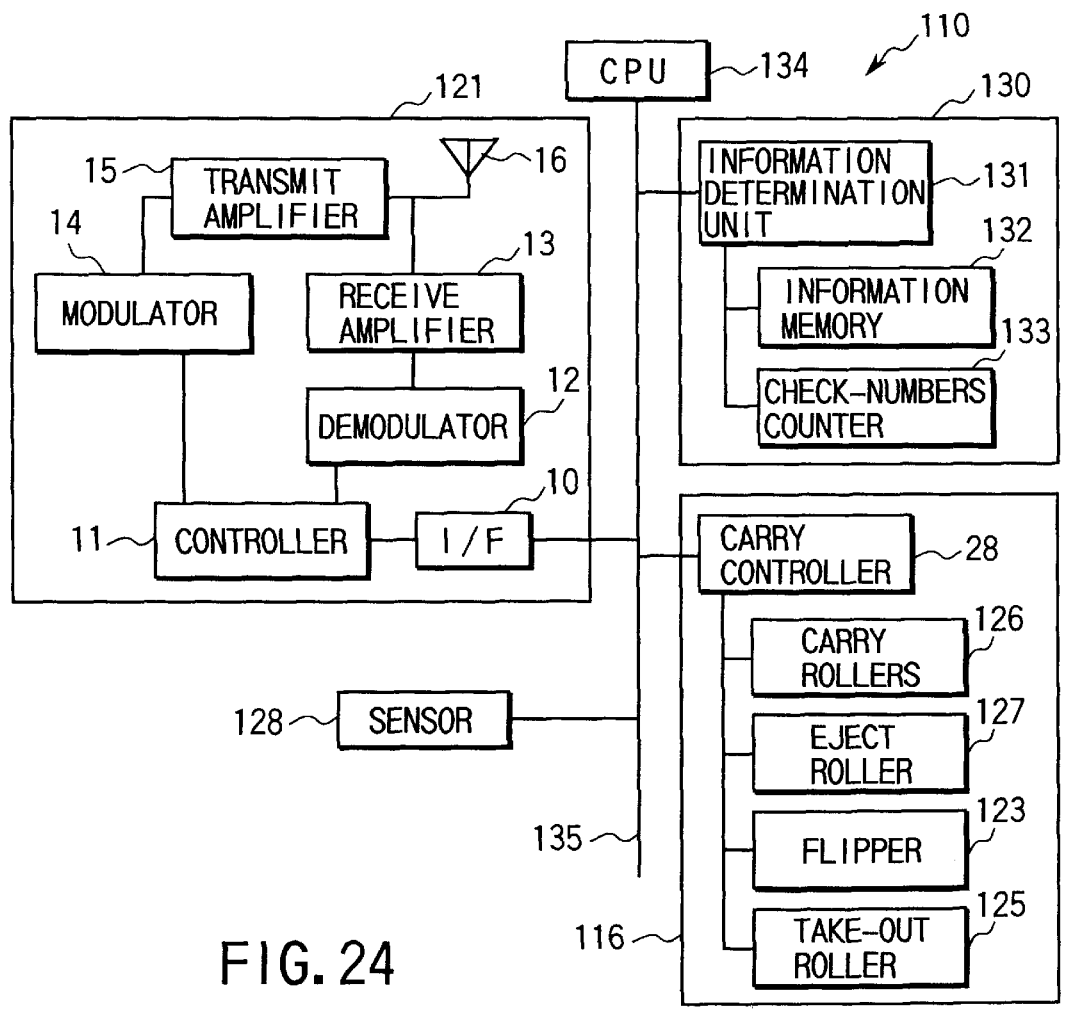
FIG. 24 is a schematic block diagram of the information writing apparatus of FIG. 23.

FIG. 24 is a block diagram of the wireless information writing apparatus 110 of FIG. 23. As shown, the reader/writer 121 is composed of an I/F 10, a controller 11, a receive amplifier 13, a demodulator 12, a modulator 14, a transmit amplifier 15, and an antenna 16.

A carrying unit 116 is equipped with a carry controller 28, the take-out roller 112, the carry rollers 126, and the eject roller 127. The carry controller controls the driving system for the rollers 126 and 127 and the flipper 123, that is, controls the take-out and feed of the wireless tag 20 and the direction of feed of the wireless tag 20. The two sets of rollers 126 are disposed to sandwich the both sides of the wireless tag 20.

The wireless information writing apparatus 110, has a checking unit 130, that includes a stored information determination unit 131, a written information memory 132, and a check-numbers counter 133. The stored information determination unit 131 checks information read from the wireless information storage unit 40 with information to be written to determine whether the information has been written without error. The determination unit makes a comparison between the number of checks made so far and a preset number of checks to determine whether the storage unit functions properly. To change the route taken by the wireless tag according to the results of the determinations, the determination unit outputs to the carry controller 28 an instruction signal for controlling the flipper 123. The memory 132 temporarily stores information to be written into the storage unit 40, and the counter 132 counts the number of checks made.

The reader/writer 121, the carry means 116 the check unit 130 and the sensor 128 are connected by a bus 135 to a CPU 134 for controlling the overall operation.

Figure 25:
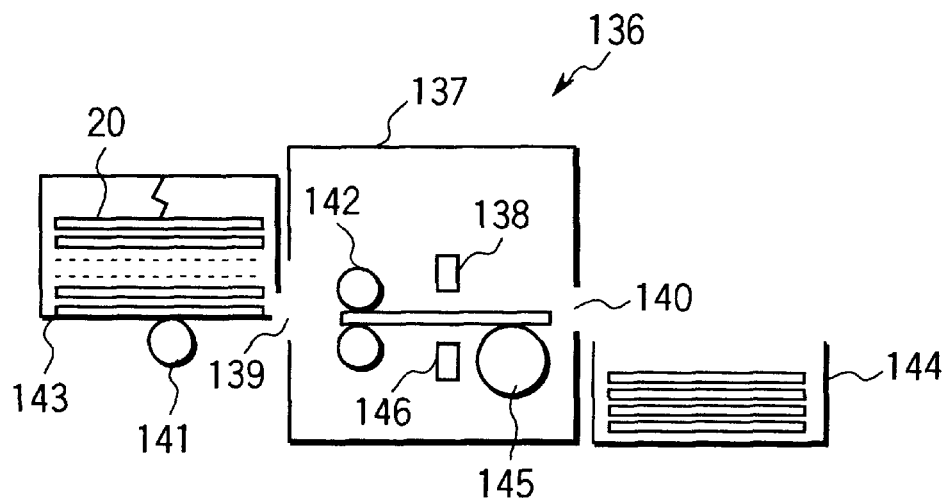
FIG. 25 is a schematic sectional view of an image printing apparatus in the second embodiment of the issuing apparatus of the present invention.

As shown in FIG. 25, the visual information printing apparatus 136 in the issuing apparatus of this embodiment has a casing 137, which includes an insertion port 139 and an ejection port 140. Outside the casing 137 is provided a stacker 143 in which wireless tags are stocked. The stacker is located opposite to the insertion port 139. At the bottom of the stacker is provided a take-out roller 141 adapted to take out and insert the wireless tags 20, one at a time, from the stacker into the port 139. A collect box 144 which collects wireless tags ejected from the ejection port 140 can be found outside the casing 137.

Located within the casing is an image printer 149 for recording visual information on the image recording unit 30 of each wireless tag 20 using a thermal head, a platen roller 145 opposed to the thermal head of the printer, rollers 142 adapted to carry the wireless tag to the ejection port 140 at a given speed, and a sensor 146 for detecting the insertion of the wireless tag into the printer 149.

Figure 26:
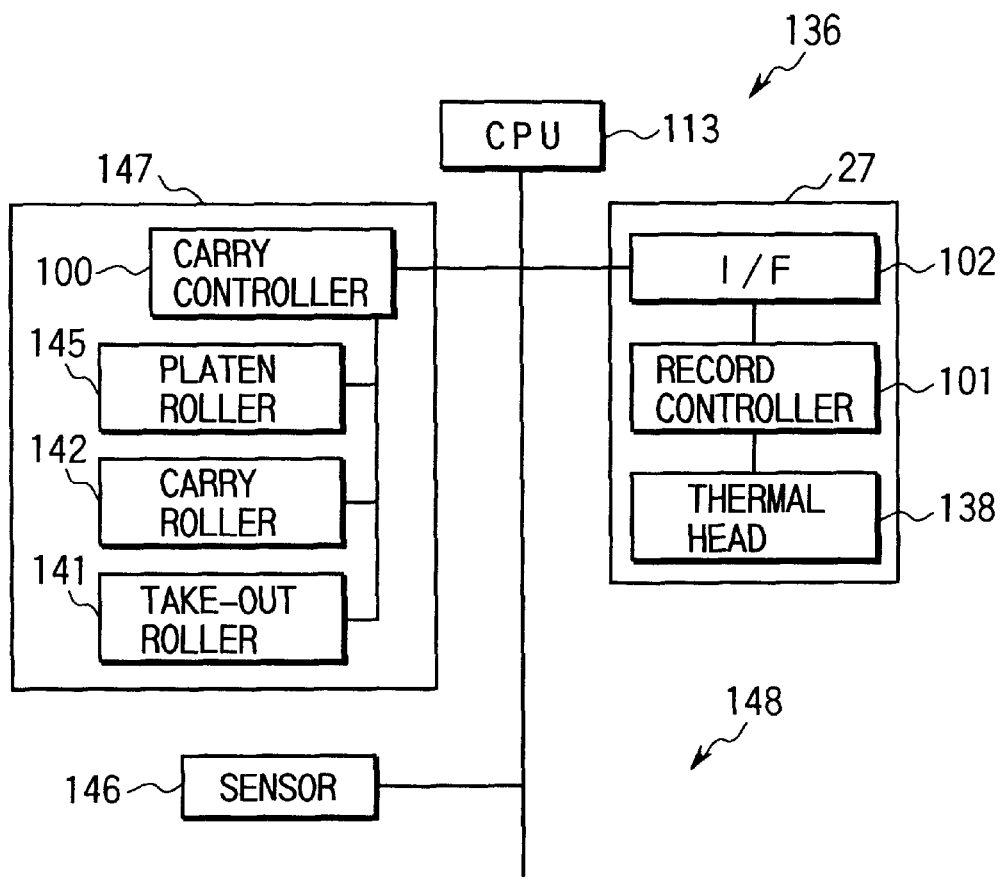
FIG. 26 is a schematic block diagram of the printing apparatus of FIG. 25.

FIG. 26 is a block diagram of the printing apparatus 136 of FIG. 25. The printing apparatus includes a carry unit 147, the printer 149, the sensor 146, and a CPU 11 for controlling the overall operation of the printing apparatus 136. The carry unit 147 includes the take-out roller 141, the carry rollers 142, the platen roller 145, and a carry controller 100. The controller 100 controls the driving system for the rollers to take out and carry a wireless tag. The printer 146, the carry unit 147 and the sensor 146 are connected by a bus 148 to the CPU 113.

Next, the operation of issuing the wireless tag 20 using the information writing apparatus 110 and the visual information printing apparatus 136 will be described. According to this embodiment, predetermined information is first written into the wireless information storage unit of a wireless tag 20 by the writing apparatus 110. Next, written information is checked. And finally, the visual information is recorded on the image recording unit of the wireless tag 20 by the printing apparatus.

Figure 27:
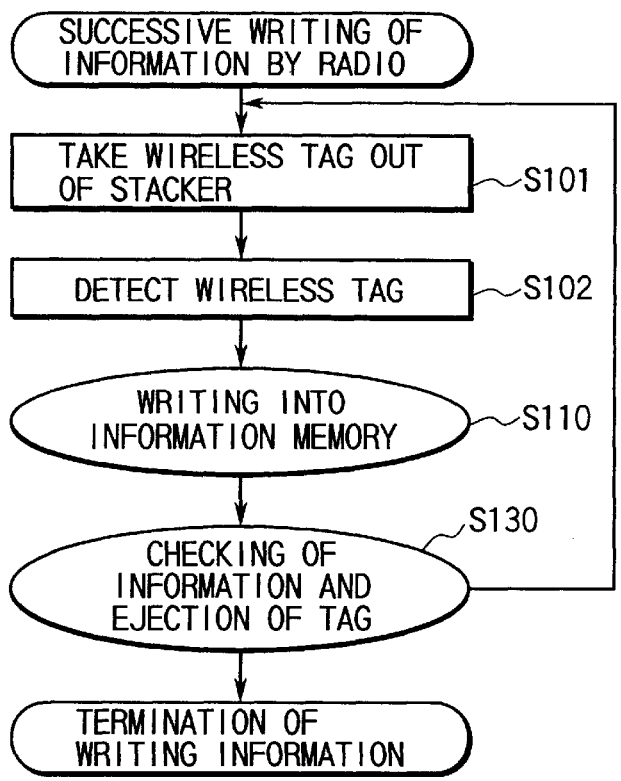
FIG. 27 is a simplified flowchart illustrating the successive writing operation of the wireless information writing apparatus of FIG. 23.
Figure 28:
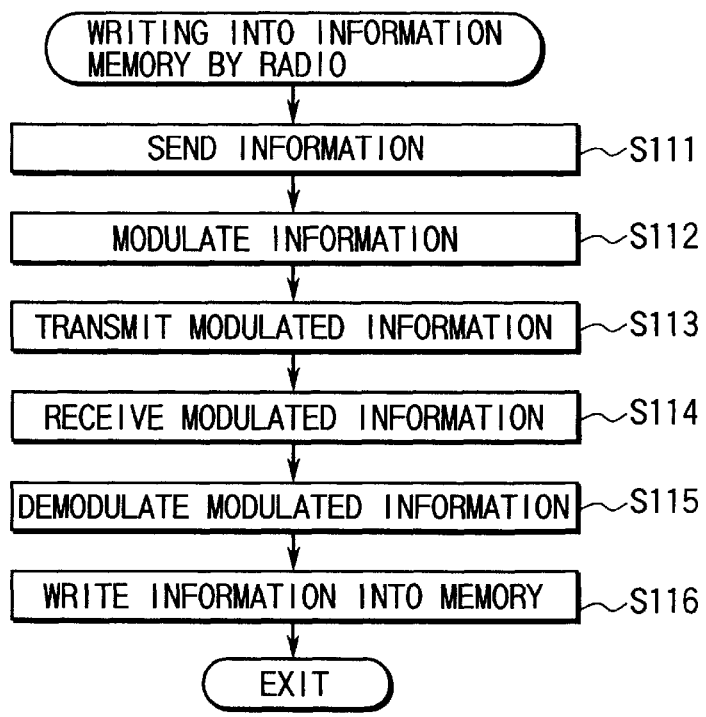
FIG. 28 is a flowchart illustrating the wireless information writing operation in the flowchart of FIG. 27.

Reference will be made to FIGS. 27 and 28 to describe an operation of successively writing information using the information writing apparatus shown in FIGS. 23 and 24.

When commanded by entry means not shown to start the processing, the CPU 134 issues a take-out roller activation signal to the carry controller 28 to drive the take-out roller 125. Thereby, of the unprocessed wireless tags 20 stacked in the stacker 122, a tag at the bottom is taken out by the roller 125 and then carried toward the reader/writer 121 (step S101).

When the sensor 128 detects the wireless tag 20 in step S102, the CPU 134 outputs a carry signal to the carry controller 28, so that the carry rollers 126 and the eject roller 127 are rotated. Thus, the wireless tag 20 is carried to the reader/writer 121 at a given speed. When the wireless tag comes to be opposed to the reader/writer, the reader/writer writes predetermined information into the wireless information storage unit 40 of the wireless tag 20 in step S110.

FIG. 28 is a detailed flowchart for the operation of writing information into the wireless information storage unit. Predetermined wireless information, which, in this example, includes destination information "HOKKAIDO", recipient information "OOO COMPANY", and article information, is sent from the CPU 134 through the I/F 10 to the controller 11 (step S61). Data from the controller 11 is modulated in the modulator 14 (step S112). The modulated information is sent from the antenna 16 to the wireless tag 20 (step S113). The modulated information signal is received by the antenna 42 of the wireless tag 20 (step S114).

In response to the received signal the power generator 21 supplies a supply voltage to the LSI chip 43. The received signal is demodulated in the demodulator 23 (step S115) and then written into the memory 26 (step S116). Thus, the writing of information into the wireless information storage unit 40 terminates.

Figure 29:
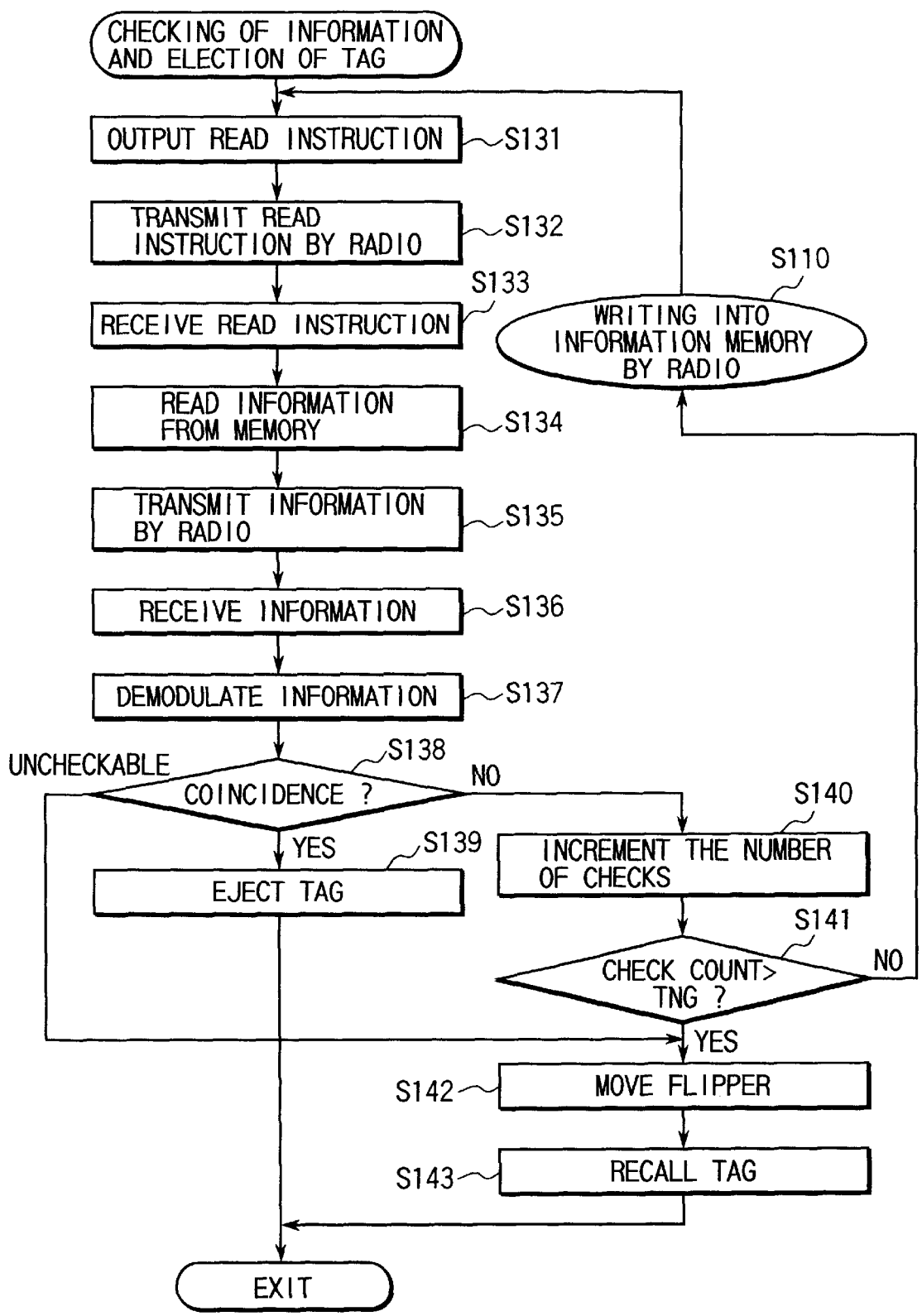
FIG. 29 is a flowchart illustrating the checking and ejecting operation in the flowchart of FIG. 27.

Subsequently, the reader/writer 121 performs check and eject processing (step 130) to determine whether or not the predetermined information has been written correctly in the wireless tag and eject the wireless tag. FIG. 29 is a flowchart for the check and eject processing. After the writing of information, the CPU 71 sends a read instruction to the reader/writer 81 (step S131). The reader/writer sends the read instruction to the wireless tag 20 by radio (step S132). Upon receipt of the read instruction, the wireless tag reads the previously stored information from the nonvolatile memory 26 (step S134), the information including the destination information "HOKKAIDO", the recipient information "OOO COMPANY", and the article information.

The read information is modulated in the modulator 45 and then transmitted from the antenna 42 of the wireless tag 20 (step S135). The transmitted information from the wireless tag is received by the antenna 16 (step S86) and then recovered in the demodulator 12 after being amplified by the receive amplifier 13 (step S137). The recovered information is sent to the controller 11.

The entered information is sent through the I/F 10 and the CPU 71 to the stored information determination unit 131 in the checking unit 130. The determination unit reads the information used in the previous writing operation (step S110) from the memory 132 and checks it with the information read from the wireless tag (step S138). When a match occurs between the previously written and read information, the CPU 134 ejects the wireless tag 20 with the carrying means 116 and collects it in the receive box 124 (step S139).

If, on the other hand, no coincidence occurs, then the CPU 134 increments the check-numbers counter 133 by one (step S140). The stored information determination unit 131 makes a comparison between the count in the counter 133 and an allowable check count TNG which has been stored beforehand in the CPU 134. When the count in the counter is less than TNG (No), the writing operation is performed again (step S110). If, however, the count in the counter is larger than TNG (Yes), the stored information determination unit 131 determines that the wireless tag 20 is defective and outputs a flipper activation signal to the carry controller 28. In response to this signal, the controller 28 moves the flipper 1123 (step S142) to route the wireless tag to the recall box 129 (step S143).

In step S138, sometimes recorded information cannot be read from the wireless tag 20. In that case, the determination unit 131 determines that the checking is impossible and activates the flipper to route the wireless tag to the recall box 129. That is, wireless tags for which it is determined checking is impossible are also recalled.

Figure 30:
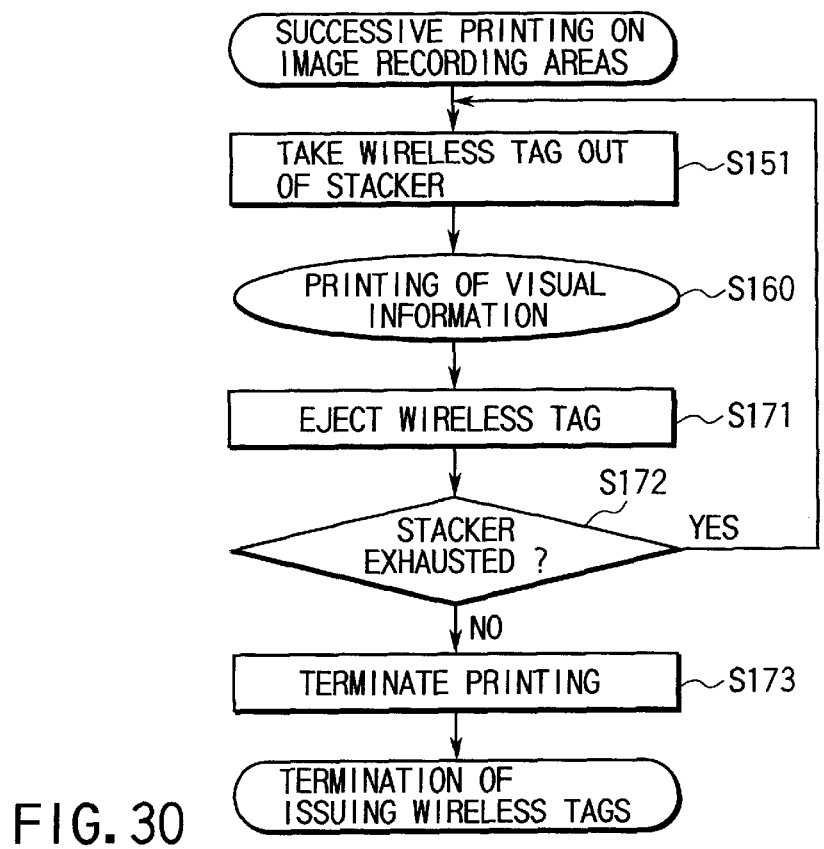
FIG. 30 is a flowchart illustrating the successive image printing operation of the image printing apparatus of FIG. 25.

Subsequently, the printing apparatus 136 as shown in FIGS. 25 and 26, is used to print visual information successively on each of the wireless tags 20 that have been written correctly with the same information. FIG. 30 is a flowchart for the successive printing.

First, upon receipt of an instruction to start the printing from the entry means that is not shown, the CPU 113 located in the printing apparatus 136 outputs a take-out roller activation signal to the carry controller 100 to drive the take-out roller 141. In the stacker 143 many wireless tags 20 written with the same information are stacked. The wireless tag 20 at the bottom of the stacker is taken out by the roller 141 and then carried toward the printer 149 (step S151).

Figure 31:
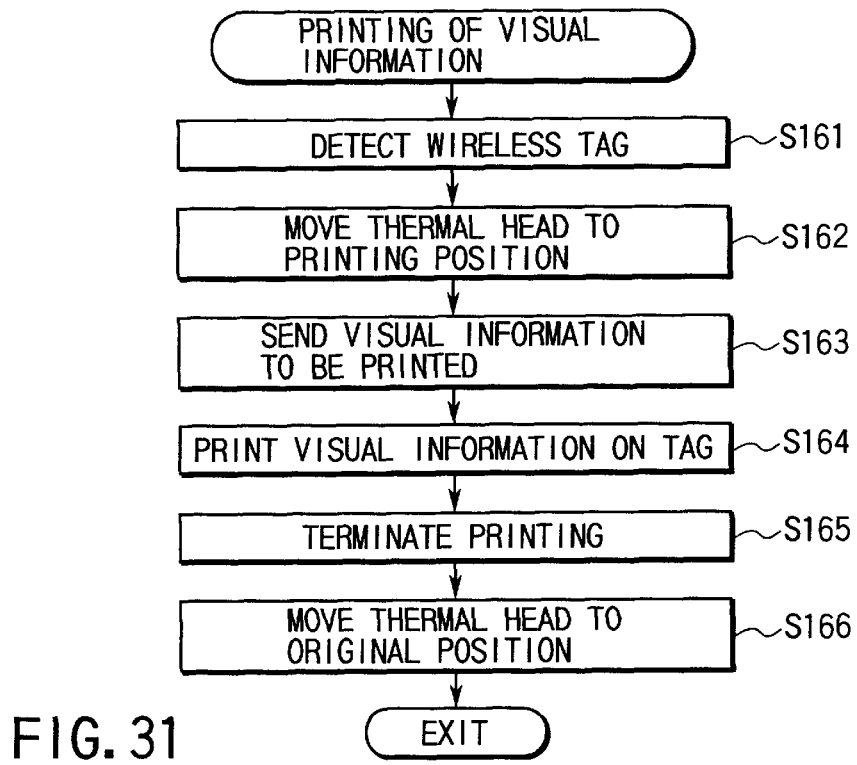
FIG. 31 is a flowchart illustrating the image printing operation in the flowchart of FIG. 30.
Figure 32:
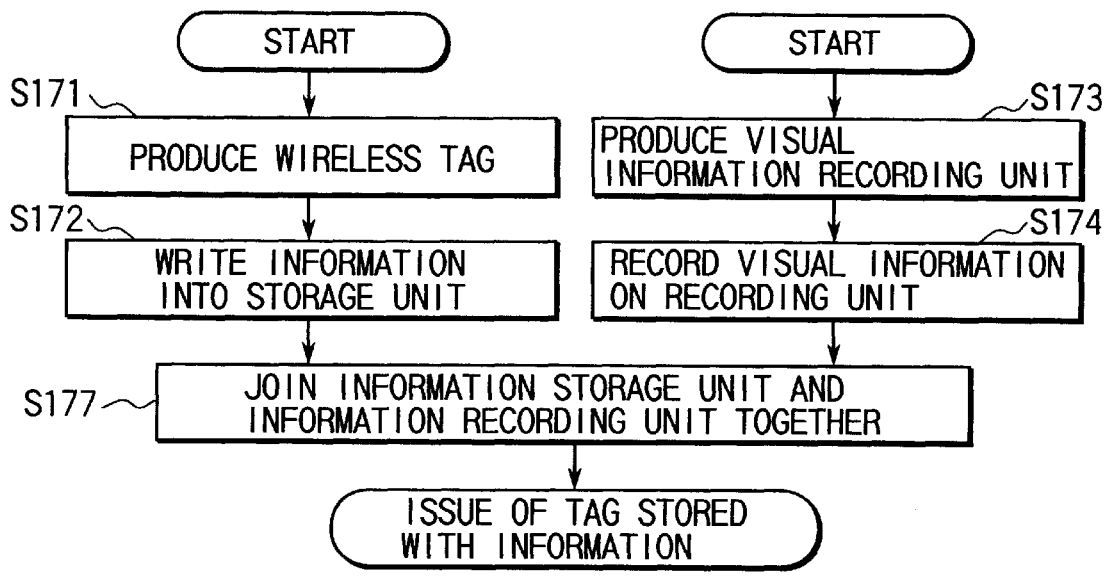
FIG. 32 is a simplified flowchart illustrating the operation of another embodiment of the issuing method of the present invention.

When the wireless tag is fed through the insertion port 139 into the casing 137, the printing of visual information is performed (step S160). FIG. 31 is a flowchart for the printing of visual information on the image recording unit of the wireless tag 20. When the sensor 146 detects the movement of the wireless tag 20 to the thermal head 138 (step S161), the thermal head moves downward from a place where it does not come into contact with the tag to a place where it comes into contact with the tag. In corporation with the platen roller 145, the thermal head 19 comes into contact with the effective recording area 44 with pressure (step S162).

The CPU 113 transfers visual information to the recording controller 101 via the I/F 102 (step S163). In this example, the information includes destination information "HOKKAIDO", recipient information "000 COMPANY", bar-code information indicating part of information concerning an article to which the wireless tag is to be attached, and recorded position information. When the wireless tag further moves and the recording starting position of its effective recording area 44 of the image recording unit 30 reaches the thermal head 138, the recording controller 101 drives the heated elements of the thermal head in accordance with visual information. As a result, the effective recording area is recorded with the destination information 90 "HOKKAIDO", the recipient information 91 "000 COMPANY", and the bar code 92 indicating information concerning a tag-attached article shown in FIG. 7A (step S164)

Upon termination of the recording of the image information, the thermal head 19 returns to the original position, thereby releasing the pressure contact with the wireless tag (step S166). The carry controller 100 rotates the rollers 142 and 145 to move the wireless tag to the eject port 140, so that the information-printed tag is collected in the collect box 144.

By repeating the operation in step S160 until the stacker 143 is exhausted, a large number of wireless tags are issued which have their wireless information storage units 40 written with predetermined information and their image recording units 30 printed with visual information corresponding to at least part of the predetermined information.

Although the above embodiment was described as performing the information writing process first and the printing process next, the printing process may be performed first.

A further embodiment of the storage medium issuing method of the present invention will be described next. This embodiment is intended to issue a large number of wireless information storage media having the same information by separately performing the information writing process and the information printing process on a wireless information storage unit and an image recording unit which are independent of each other and then joining the processed storage unit and the processed recording unit together.

That is, as shown in FIGS. 32, 33A, 33B and 33C, wireless information storage units 40 and image recording units 30 are separately produced in large quantities.

Figure 33A:
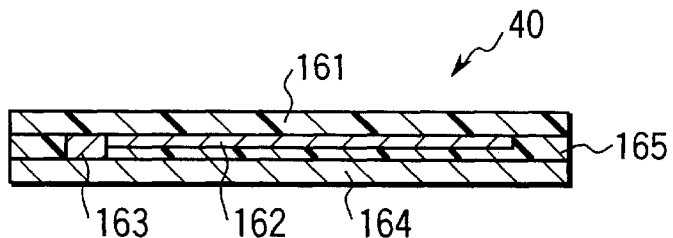
FIGS. 33A, 33B and 33C are sectional views of wireless tags issued in accordance with the issuing method of FIG. 32.

As shown in FIG. 33A, the wireless information storage unit 40 comprises a loop antenna 16 placed in the periphery of one side of a first rectangular base member 161 and an LSI chip 163 placed at an end of the base member and serving as wireless transmit/receive control means that permits information to be written into and read from in a non-contact manner. A second base member 164 of the same size is stuck on the first base member 161 by an adhesive layer 165 to cover the antenna and the LSI chip. The LSI chip is the same in arrangement as those described previously.

The wireless information storage unit 40 is produced as follows. Copper foil is stuck on a polycarbonate film of about 100 μm in thickness. A plurality of sets of patterns, each set comprising an antenna pattern, a wiring pattern, and a connection pad pattern for the LSI chip, is formed in the copper foil by means of the PEP method. The antenna pattern is formed in the periphery of the first base member 161. The LSI chip connection pad pattern is formed so that it will locate at an end of the wireless information storage unit 40. An LSI chip is die bonded to the connection pad pattern.

The antennas 162 and the LSI chips 163 on the first base member 161 are covered with the second base member 164 and an adhesive agent is filled in between both the base members to stick the base members together. The first and second base members are diced into pieces each in the form of a label 60 mm long and 30 mm wide, thereby obtaining wireless information storage units 40 each with an LSI chip and an antenna.

Figure 33B:
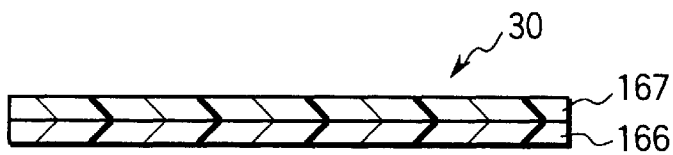

As shown in FIG. 33B, the image recording unit 30 consists of a sheet-like base member 166, such as paper or plastic, and a thermosensitive recording layer 167 formed on the base member. Here, a thermosensitive material is applied onto a thermal base paper to form the thermosensitive recording layer 167 and after drying the base paper is diced into pieces each of the same size as the wireless information storage unit 40, thereby obtaining the image recording unit 30.

Subsequently, predetermined information is written into each of wireless information storage units 40 in a non-contact manner using a information writing apparatus and then checking processing is performed on each storage unit. As the information writing apparatus, use is made of the one described previously and writing, checking and ejecting are performed in the same manner as in FIGS. 27, 28 and 29. This processing allows a large number of wireless information storage units 40 written correctly with the same information to be produced.

Concurrent with writing the information into the wireless information storage units 40 or separately, the image information corresponding to at least part of the predetermined information is consecutively printed on each of the image recording units 30 using the image printing apparatus. The information printing apparatus, as described previously is used to print in the same manner as in FIGS. 30 and 31. This image printing process allows a large number of image recording units 30 that are recorded with the same visual information to be produced.

Figure 33C:
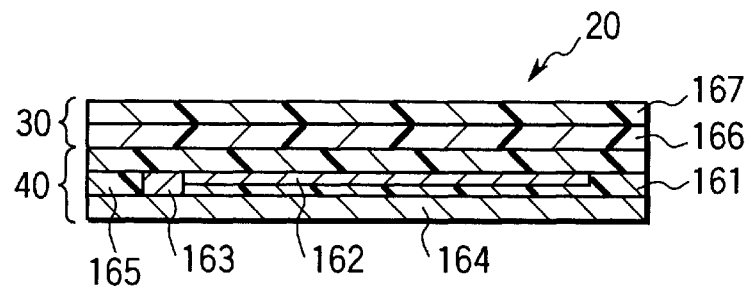

After that, the member 161 of the wireless information storage unit 40 and the member 166 of the image recording unit 30 are joined together to obtain a wireless tag 20, i.e., a wireless information storage unit, as shown in FIG. 33C.

This embodiment provides the same advantages as the previously described embodiments. Further, this embodiment allows defective wireless information storage units, which are semi-finish products as wireless tags, to be rejected and ensures higher yield and efficiency.

The present invention may be implemented in still other ways without departing from its scope and spirit. For example, the wireless information storage medium to be issued is not limited to the above-described wireless article tag and may be applied to any other wireless information storage media such as wireless price tags.

As described above in detail, according to the wireless information storage medium issuing method of the present invention, by performing the information writing process and the image printing process separately, the operating time or the number of apparatuses for those processes can be set to conform to each process. Therefore, efficient issuing process can be provided in comparison with the conventional issuing method that performs the information writing process and the image printing process in succession. The information writing process and the image printing process can be performed in lots, respectively and the concurrent processing allows wireless information storage units to be efficiently issued in large quantities.

Moreover, a wireless information writing apparatus and an image printing apparatus that are independent of each other can be used. In the information writing process, the effect of external noise is reduced and thus, improves reliability. As a result, the checking time can be reduced, allowing efficient large-quantity issuing.

Furthermore, according to the issuing method of this invention, a process is added which allows only wireless information storage units that cannot be checked to be rejected in the middle of the issuing process. This obtains a yield of nearly 100% at the final stage of the issuing process.

Additional advantages and modifications will readily occurs to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An apparatus for issuing a wireless information storage medium provided with a semiconductor integrated circuit having a memory section for storing information and a wireless transmitter/receiver section for transmitting and receiving information by radio and an image recording area which is placed away from the semiconductor integrated circuit and on which visual information is to be printed, comprising:
    an insertion/ejection port for inserting or ejecting the wireless information storage medium;
    printing means for printing visual information corresponding to at least part of information to be written into the memory section on the image recording area;
    first carry means for carrying a wireless information storage medium inserted into the insertion/ejection port with its information recording area at the head to a position where it is opposed to the printing means;
    reader/writer means installed between the insertion/ejection port and the printing means for writing information into the semiconductor integrated circuit in a non-contact manner; and
    second carry means for carrying the wireless information storage medium to the insertion/ejection port for ejection.

2. The apparatus according to claim 1, wherein the reader/writer means includes means for reading the information written into the semiconductor integrated circuit from it and checking the read information with the information to be written into it.

3. The apparatus according to claim 2, wherein the printing means includes overwrite thermal recording means for simultaneously performing thermal recording and thermal erasing on the visual information recording area.

4. The apparatus according to claim 3, wherein the reader/writer means includes rewriting means for writing information again on the basis of the results of checks, and the apparatus further comprises means for recalling wireless information storage media on the basis of the results of checks made on the information written by the rewriting means.

5. The apparatus according to claim 4, further comprising means for causing the rewriting means and the checking means to repeat the writing and checking, counting the number of times checks have been made, and causing the recalling means to recall a storage medium for which the number of times checks have been made reaches a predetermined number of times.

6. A method of issuing a wireless information storage medium provided with a wireless information storage unit, having a memory section for storing information and a wireless transmitter/receiver section for transmitting and receiving the information, and an image recording unit, comprising:
    inserting the wireless information storage medium into an apparatus for issuing the wireless information storage medium;
    carrying the wireless information storage medium into the apparatus;
    printing at least a part of the information to be stored in the memory section of the wireless information storage unit onto the image recording unit;
    writing the information into the memory section by transmitting the information to be stored into the memory section to the wireless transmitter/receiver section; and
    carrying the wireless information storage medium from the apparatus for ejection once the information has been written into the memory section; and reading the information written into the memory section of the wireless information storage unit through the wireless transmitter/receiver section to check the stored information read from the memory section with the information before being transmitted to the wireless information storage unit.

7. The method according to claim 6, further comprising:

rewriting the information into the memory section of the wireless information storage media if the check indicates a mismatch.

8. The method according to claim 6, further comprising:

separating the wireless information storage media after writing the information into the memory section according to the results of the check; and recalling the wireless information storage media for which the check indicates the mismatch even after writing the information a predetermined number of times.

9. A method of issuing a wireless information storage medium provided with a wireless information storage unit, having a memory section for storing information and a wireless transmitter/receiver section for transmitting and receiving information by radio, and an image recording unit on which visual information is to be printed comprising:

inserting the wireless information storage medium into an apparatus for issuing the storage medium;

carrying the wireless information storage medium into the apparatus upon insertion;

printing visual information corresponding at least part of the information to be stored into the memory section of the wireless information storage medium;

writing the information into the memory section by transmitting the information to be stored into the memory section to the wireless transmitter/receiver section by radio;

carrying the wireless information storage medium on which the information has been written for ejection from the apparatus;

binding the image recording unit printed with the visual information and the wireless information storage unit written with the stored information together; and reading the stored information from the memory section through the wireless transmitter/receiver section to check the stored information with the information before being transmitted.

10. The method according to claim 9, further comprising:

writing the information successively into the memory section of each of a plurality of wireless information storage units;

separating the wireless information storage units after writing the information into the memory section according to the result of the check; and binding the wireless information storage unit for which the check indicates the match and an image recording unit printed with at least part of the information.

11. The method according to claim 10, further comprising:

rewriting the information into the memory section of the wireless information storage units if the check indicates a mismatch.

12. The method according to claim 11, wherein separating the wireless information storage units includes recalling the information storage units for which the check results indicate a mismatch even after writing the information into the memory section a predetermined number of times.

13. The method according to claim 11, wherein writing the information is performed before printing visual information and further comprises:

separating the wireless information storage media according to the check; and printing only the information within the wireless storage media for which the check indicates a match.

14. A method of issuing a wireless information storage media provided with a wireless formation storage unit, having a memory section for storing information and a wireless transmitter/receiver section for transmitting and receiving information, and an image recording unit on which visual information is to be printed, comprising:

printing visual information corresponding to at least part of the information to be stored in the memory section of the image recording unit of each of a plurality of the wireless information storage media in succession;

transmitting the information to be stored into the memory section to the wireless transmitter/receiver section to write the information into the memory section of the wireless information storage unit of each of a plurality of the wireless information storage media in successions;

reading, in succession, the information written into the memory section of the wireless information storage unit through the wireless transmitter/receiver section to check the stored information read from the memory section with the information before being transmitted to the wireless information storage unit; and binding the image recording unit printed with the visual information end the wireless information storage unit written with the stored information together.

* * * * *